United States Patent
Toyoda et al.

(10) Patent No.: US 9,725,611 B2
(45) Date of Patent: Aug. 8, 2017

(54) ULTRAVIOLET RAY CURABLE INK COMPOSITION FOR USE IN INK JET METHOD AND PRINTED OBJECT

(71) Applicant: SEIKO EPSON CORPORATION, Tokyo (JP)

(72) Inventors: Naoyuki Toyoda, Suwa (JP); Koki Hirata, Matsumoto (JP); Tomohiro Ogawa, Okaya (JP); Masaya Shibatani, Matsumoto (JP); Masaru Terada, Seto (JP); Hiroshi Takiguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/085,329

(22) Filed: Nov. 20, 2013

(65) Prior Publication Data

US 2014/0154480 A1 Jun. 5, 2014

(30) Foreign Application Priority Data

Dec. 3, 2012 (JP) .................. 2012-264696

(51) Int. Cl.
- C08K 5/56 (2006.01)
- C09D 11/00 (2014.01)
- C09D 11/38 (2014.01)
- C09D 11/101 (2014.01)
- C09D 11/322 (2014.01)

(52) U.S. Cl.
CPC ............ C09D 11/38 (2013.01); C09D 11/101 (2013.01); C09D 11/322 (2013.01); *Y10T 428/24802* (2015.01)

(58) Field of Classification Search
CPC ...... C09D 11/101; C09D 11/38; C09D 11/322
USPC ......................................... 524/712, 730, 786
See application file for complete search history.

(56) References Cited

U.S. PATENT DOCUMENTS

| | | | |
|---|---|---|---|
| 4,990,186 A * | 2/1991 | Jones et al. ................. | 106/31.37 |
| 6,258,155 B1 | 7/2001 | Guistina et al. | |
| 6,340,723 B1 | 1/2002 | Nitta et al. | |
| 8,771,824 B2 | 7/2014 | Toyoda et al. | |
| 8,895,638 B2 | 11/2014 | Toyoda et al. | |
| 2003/0150354 A1 | 8/2003 | Ito et al. | |
| 2006/0240259 A1 * | 10/2006 | Toyoda ................. | B22F 1/0059 428/403 |
| 2008/0213518 A1 | 9/2008 | Oyanagi et al. | |
| 2009/0208651 A1 * | 8/2009 | Oyanagi ............... | C09D 7/1283 427/256 |
| 2009/0280302 A1 | 11/2009 | Fukumoto et al. | |
| 2010/0021701 A1 | 1/2010 | Heinrichs | |
| 2010/0028625 A1 | 2/2010 | Kagata et al. | |
| 2010/0279083 A1 | 11/2010 | Trummer et al. | |
| 2011/0159251 A1 * | 6/2011 | Sato .......................... | C08F 2/44 428/195.1 |
| 2012/0295076 A1 | 11/2012 | Toyoda et al. | |
| 2012/0295082 A1 * | 11/2012 | Toyoda et al. ................ | 428/208 |
| 2013/0196125 A1 | 8/2013 | Toyoda et al. | |
| 2013/0196126 A1 | 8/2013 | Toyoda et al. | |
| 2014/0093709 A1 | 4/2014 | Toyoda et al. | |

FOREIGN PATENT DOCUMENTS

| | | |
|---|---|---|
| EP | 2623570 | 8/2013 |
| EP | 2631080 | 8/2013 |
| JP | 2001-106937 | 4/2001 |
| JP | 2001164150 A * | 6/2001 |
| JP | 2001-226619 | 8/2001 |
| JP | 2009-057548 | 3/2009 |
| JP | 2009-544774 | 12/2009 |
| JP | 2010053328 | 3/2010 |
| JP | 2011-508030 | 3/2011 |
| JP | 2011-137083 | 7/2011 |
| JP | 2012-007031 | 1/2012 |
| JP | 2012-077221 | 4/2012 |
| JP | 2012-077222 | 4/2012 |
| JP | 2012-102294 | 5/2012 |
| JP | 2012-102295 | 5/2012 |
| JP | 2012-207187 | 10/2012 |
| WO | 2011-080973 | 7/2011 |

OTHER PUBLICATIONS

Machine translation of JP 2001164150 A, 2001.*
European Search Report for European Patent Application No. 13195525.4 dated Mar. 6, 2014.
European Search Report for European Patent Application No. 13195525.4 dated Jun. 3, 2014.

* cited by examiner

*Primary Examiner* — Wenwen Cai
(74) *Attorney, Agent, or Firm* — Workman Nydegger

(57) ABSTRACT

An ultraviolet ray curable ink composition adapted to be ejected by using an ink jet method is provided. The ultraviolet ray curable ink composition includes a polymerizable compound, metal powder, and a liquid component having an alicyclic structure including a hetero atom. The metal powder is constituted from metal particles subjected to a surface treatment with a fluorine type silane compound and/or a fluorine type phosphoric acid ester as a surface treatment agent. An amount of the liquid component contained in the ultraviolet ray curable ink composition is in the range of 0.05 mass % or more but 7.0 mass % or less. A printed object is also provided. Such a printed object is produced by using the ultraviolet ray curable ink composition.

17 Claims, No Drawings ately is used in the ink jet method (for example, Patent
ULTRAVIOLET RAY CURABLE INK COMPOSITION FOR USE IN INK JET METHOD AND PRINTED OBJECT

CROSS-REFERENCE TO RELATED APPLICATION

This application is based on and claims a priority from a Japanese Patent Application No. 2012-264696 filed on Dec. 3, 2012, which is hereby expressly incorporated by reference herein in its entirety.

BACKGROUND

1. Technical Field

The present invention relates to an ultraviolet ray curable ink composition for use in an ink jet method (hereinafter, simply referred to as "ultraviolet ray curable ink composition") and a printed object.

2. Related Art

Conventionally, as a method of manufacturing a trinket showing an appearance having gloss, used is a metal plating, a metal foil press printing using a metal foil, a thermal transfer using a metal foil or the like.

However, there are problems in that a fine pattern is hardly to be formed by using such methods or such methods are difficult to be used for a curved surface portion. Furthermore, the metal foil press printing is difficult to achieve on-demand printing, so that there are problems in that it is difficult to supply various kinds of print materials or it is difficult to form metal-texture printing having gradation.

On the other hand, as a method of recording a composition containing a pigment or a dye onto a recording medium, used is a method of recording the composition using an ink jet method. The ink jet method has such advantages as to be able to form the fine pattern or to be used for the curved surface portion. Further, in order to further improve wear resistance, water resistance, solvent resistance and the like of a printed portion, recently, a composition (ultraviolet ray curable ink composition), which includes a polymerizable compound and can be cured due to ultraviolet ray irradiation, is used in the ink jet method (for example, Patent document 1).

However, in the case where metal particles of metal powder are used instead of the pigment or the dye in the ultraviolet ray curable ink composition, there is a problem in that it is difficult to sufficiently exhibit properties such as gloss provided inherently by the metal. In addition, stability (storage stability) of the composition is lowered. This causes a problem in that the composition is turned into a gel, and thus ejection stability of the composition is lowered due to viscosity increase thereof.

The Patent Document 1 is JP-A 2009-57548 which is an example of related art.

SUMMARY

Accordingly, it is an object of the present invention to provide an ultraviolet ray curable ink composition which has excellent storage stability, can provide excellent dispersion stability of metal particles of metal powder, and can be reliably used for producing a pattern (printed portion) having high gloss and excellent wear resistance. Furthermore, it is another object of the present invention to provide a printed object having such a pattern having high gloss and excellent wear resistance produced by using the ultraviolet ray curable ink composition.

These objects are achieved by the present inventions described below.

An ultraviolet ray curable ink composition adapted to be ejected by using an ink jet method of the invention, comprises:
 a polymerizable compound;
 metal powder; and
 a liquid component having an alicyclic structure including a hetero atom;
 wherein the metal powder is constituted from metal particles subjected to a surface treatment with a fluorine type silane compound and/or a fluorine type phosphoric acid ester as a surface treatment agent, and
 wherein an amount of the liquid component contained in the ultraviolet ray curable ink composition is in the range of 0.05 mass % or more but 7.0 mass % or less.

This makes it possible to provide the ultraviolet ray curable ink composition which has excellent storage stability, can provide excellent dispersion stability of the metal particles of the metal powder, and can be reliably used for producing a pattern (printed portion) having high gloss and excellent wear resistance.

In the ultraviolet ray curable ink composition of the invention, it is preferred that the alicyclic structure including the hetero atom of the liquid component includes a lactone structure and/or a lactam structure.

This makes it possible to improve the storage stability of the ultraviolet ray curable ink composition especially, and gloss of a printed portion of a printed object produced by using the ultraviolet ray curable ink composition.

In the ultraviolet ray curable ink composition of the invention, it is also preferred that the alicyclic structure including the hetero atom of the liquid component includes a cyclic structure of a five-membered ring.

This makes it possible to improve the storage stability of the ultraviolet ray curable ink composition especially, and the gloss of the printed portion of the printed object produced by using the ultraviolet ray curable ink composition.

In the ultraviolet ray curable ink composition of the invention, it is also preferred that a number of the hetero atom included in the alicyclic structure is 1.

This makes it possible to improve the storage stability of the ultraviolet ray curable ink composition especially, and the gloss of the printed portion of the printed object produced by using the ultraviolet ray curable ink composition.

In the ultraviolet ray curable ink composition of the invention, it is also preferred that each of the metal particles of the metal powder is constituted from a base particle and Al constituting at least a surface of the base particle, and the metal particle is subjected to the surface treatment with the fluorine type silane compound and/or the fluorine type phosphoric acid ester.

Al inherently shows especially excellent gloss among various kinds of metal materials. However, in the case where powder constituted from particles formed from Al is used in an ultraviolet ray curable ink composition, the present inventors have found that storage stability of the ultraviolet ray curable ink composition becomes particularly low, the ultraviolet ray curable ink composition is turned into a gel, and therefore the problems such as lowering of ejection stability of the ultraviolet ray curable ink composition due to viscosity increase thereof occur more remarkably. On the other hand, even if the powder constituted from the particles of which surfaces are constituted of Al is used in the invention, it is possible to reliably prevent the problems as described above from occurring. Specifically, in the metal powder constituting the ultraviolet ray curable ink composition, the metal particles, of which at least surfaces are constituted of Al as a main component thereof, of the metal powder are subjected to a surface treatment with a fluorine type silane compound and/or a fluorine type phosphoric acid ester. This makes it possible to exhibit the effects of the invention conspicuously.

In the ultraviolet ray curable ink composition of the invention, it is also preferred that when the metal particles of the metal powder are subjected to the surface treatment with the fluorine type silane compound the fluorine type silane compound has a chemical structure represented by the following formula (1):

$$R^1SiX^1_aR^2_{(3-a)} \qquad (1)$$

where in the above formula (1), "$R^1$" represents a hydrocarbon group in which a part or all of hydrogen atoms are substituted with fluorine atoms, "$X^1$" represents a hydrolysis group, an ether group, a chloro group or a hydroxyl group, "$R^2$" represents an alkyl group having a carbon number in the range of 1 or more but 4 or less, and "a" is an integral number in the range of 1 or more but 3 or less.

This makes it possible to improve the storage stability of the ultraviolet ray curable ink composition especially, and the gloss and wear resistance of the printed portion of the printed object produced by using the ultraviolet ray curable ink composition.

In the ultraviolet ray curable ink composition of the invention, it is also preferred that when the metal particles of the metal powder are subjected to the surface treatment with the fluorine type phosphoric acid ester, the fluorine type phosphoric acid ester has a chemical structure represented by the following formula (2):

$$POR_n(OH)_{3-n} \qquad (2)$$

where in the above formula (2), "R" is $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$ or $CF_3(CF_2)_m(CH_2)_lO-$, "n" is an integral number in the range of 1 or more but 3 or less, "m" is an integral number in the range of 5 or more but 17 or less, and "l" is an integral number in the range of 1 or more but 12 or less.

This makes it possible to improve the storage stability of the ultraviolet ray curable ink composition especially, and the gloss and the wear resistance of the printed portion of the printed object produced by using the ultraviolet ray curable ink composition.

In the ultraviolet ray curable ink composition of the invention, it is also preferred that when the metal particles of the metal powder are subjected to the surface treatment with the fluorine type phosphoric acid ester, the fluorine type phosphoric acid ester is represented by $CF_3(CF_2)_5(CH_2)_2O(P)(OH)_2$ and/or $CF_3(CF_2)_5(CH_2)_2O(P)(OH)(OCH_2CH_3)$.

This ensures that the metal particles of the metal powder are subjected to the surface treatment reliably and sufficiently. As a result, it is possible to improve chemical stability and dispersion stability of the metal particles of the metal powder in the ultraviolet ray curable ink composition and make the storage stability and the ejection stability for a long period of time of the ultraviolet ray curable ink composition excellent. Further, in the printed object produced by using the ultraviolet ray curable ink composition, it is possible to reliably arrange the metal particles of the metal powder at the vicinity of an outer surface of the printed portion, so that it is possible to efficiently exhibit characteristics such as the gloss which are inherently possessed by a metal material of the metal particles constituting the metal powder. Further, even if a polymerizable compound having low surface tension is used as a constituent material of the ultraviolet ray curable ink composition, it is possible to reliably arrange the metal particles of the metal powder at the vicinity of the outer surface of the printed portion in the printed object produced by using the ultraviolet ray curable ink composition. Consequently, it is possible to efficiently exhibit the characteristics such as the gloss which are inherently possessed by the metal material of the metal particles constituting the metal powder.

In the ultraviolet ray curable ink composition of the invention, it is also preferred that the polymerizable compound includes a monomer having an alicyclic structure.

This makes it possible to improve the storage stability of the ultraviolet ray curable ink composition especially, and the gloss and the wear resistance of the printed portion of the printed object produced by using the ultraviolet ray curable ink composition.

In the ultraviolet ray curable ink composition of the invention, it is also preferred that an amount of the monomer having the alicyclic structure contained in the ultraviolet ray curable ink composition is in the range of 40 mass % or more but 90 mass % or less.

This makes it possible to improve the dispersion stability of metal particles of metal powder, and therefore obtain the excellent ejection stability of the ultraviolet ray curable ink composition for a long period of time. In particular, even if the ultraviolet ray curable ink composition does not contain a dispersant, the excellent effects as described above are obtained.

In the ultraviolet ray curable ink composition of the invention, it is also preferred that the monomer having the alicyclic structure includes a monofunctional monomer having a hetero atom in the alicyclic structure.

This makes it possible to improve the dispersion stability of metal particles of metal powder, and therefore obtain the excellent ejection stability of the ultraviolet ray curable ink composition for the long period of time. In particular, even if the ultraviolet ray curable ink composition does not contain a dispersant, the excellent effects as described above are obtained.

In the ultraviolet ray curable ink composition of the invention, it is also preferred that an amount of the monofunctional monomer contained in the ultraviolet ray curable ink composition is in the range of 10 mass % or more but 80 mass % or less.

This makes it possible to suppress cure shrinkage of the ultraviolet ray curable ink composition, thereby reliably obtaining the ultraviolet ray curable ink composition in which the metal particles are scattered in a small amount thereof. Consequently, it is possible to reliably use the ultraviolet ray curable ink composition for producing the printed object provided with the pattern (printed portion) having excellent gloss.

In the ultraviolet ray curable ink composition of the invention, it is also preferred that the monomer having the alicyclic structure includes one or more selected from the group consisting of tris(2-acryloyloxy ethyl) isocyanurate, dicyclopentenyl oxyethyl acrylate, adamantyl acrylate, γ-butyrolactone acrylate, N-vinyl caprolactam, N-vinyl pyrrolidone, pentamethyl piperidyl acrylate, tetramethyl piperidyl acrylate, 2-methyl-2-adamantyl acrylate, 2-ethyl-2-adamantyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine and tetrahydrofurfuryl acrylate.

This makes it possible to further improve the gloss and high-grade sense of the printed object to be produced by using the ultraviolet ray curable ink composition. Furthermore, it is possible to further improve the storage stability and the ejection stability of the ultraviolet ray curable ink composition.

In the ultraviolet ray curable ink composition of the invention, it is also preferred that the polymerizable compound includes one or more selected from the group consisting of phenoxy ethyl acrylate, 2-(2-vinyloxy ethoxy) ethyl acrylate, dipropylene glycol diacrylate, tripropylene glycol diacrylate, 2-hydroxy-3-phenoxy propyl acrylate and 4-hydroxy butyl acrylate in other than the monomer having the alicyclic structure.

In this case, it is possible to especially improve the storage stability and the ejection stability of the ultraviolet ray curable ink composition, and to make reactivity of the ultraviolet ray curable ink composition ejected by the ink jet method more excellent. This makes it possible to further improve productivity of the printed object and the wear resistance and the like of the pattern to be formed.

A printed object of the invention is produced by applying the ultraviolet ray curable ink composition described above onto a recording medium, and then irradiating the ultraviolet ray curable ink composition with an ultraviolet ray.

This makes it possible to provide the printed object including the pattern (printed portion) having excellent gloss and excellent wear resistance.

DESCRIPTION OF EXEMPLARY EMBODIMENT

Hereinbelow, preferred embodiments of the invention will be described in detail.

Ultraviolet Ray Curable Ink Composition

First, an ultraviolet ray curable ink composition for use in an ink jet method (hereinafter, simply referred to as "ultraviolet ray curable ink composition") of the invention will be described.

The ultraviolet ray curable ink composition of the invention is adapted to be ejected using the ink jet method and includes a polymerizable compound which is polymerized by irradiating with an ultraviolet ray.

Meanwhile, conventionally, as a method of manufacturing a trinket showing an appearance having gloss, used is a metal plating, a metal foil press printing using a metal foil, a thermal transfer using a metal foil or the like.

However, there are problems in that a fine pattern is hardly to be formed by using such methods or such methods are difficult to be used with respect to a curved surface portion. Further, there is also a problem in that the use of the metal foil press printing cannot form a metal-texture printing having a gradation.

On the other hand, as a method of recording a composition containing a pigment or a dye onto a recording medium, used is a method of recording the composition using an ink jet method. The ink jet method has such advantages as to be able to form the fine pattern or to be used with respect to the curved surface portion. Further, in order to further improve wear resistance, water resistance, solvent resistance and the like of a printed portion, recently, a composition (ultraviolet ray curable ink composition), which includes a polymerizable compound and can be cured due to ultraviolet ray irradiation, is used in the ink jet method.

However, in the case where metal powder are used instead of the pigment or the dye in the ultraviolet ray curable ink composition, there is a problem in that it is difficult to sufficiently exhibit properties such as gloss provided inherently by the metal. In addition, stability (storage stability) of the composition is lowered. This causes a problem in that the composition is tuned into a gel, and thus ejection stability and the like of the composition is lowered due to viscosity increase thereof.

Accordingly, the present inventors have earnestly conducted studies for a purpose of solving the above problems. As a result, they have found the invention. In other words, the ultraviolet ray curable ink composition of the invention contains a liquid component having an alicyclic structure including a hetero atom in addition to the polymerizable compound and metal powder. Metal particles of the metal powder are subjected to a surface treatment with a fluorine type silane compound and/or a fluorine type phosphoric acid ester as a surface treatment agent. An amount of the liquid component contained in the ultraviolet ray curable ink composition is in the range of 0.05 mass % or more but 7.0 mass % or less. Even if an amount of a dispersant contained in the ultraviolet ray curable ink composition is low or the ultraviolet ray curable ink composition contains no dispersant, it is possible to improve chemical stability and dispersion stability of the metal particles of the metal powder in the ultraviolet ray curable ink composition and make the storage stability and the ejection stability for a long period of time of the ultraviolet ray curable ink composition excellent. Further, it is possible to reliably arrange the metal particles of the metal powder at the vicinity of an outer surface of a printed portion in a printed object produced by using the ultraviolet ray curable ink composition. Consequently, it is possible to efficiently exhibit characteristics such as gloss which are inherently possessed by a metal material of the metal particles constituting the metal powder.

In the invention, the alicyclic structure means a cyclic structure having no aromatic property (pi-conjugated system), which includes a hetero atom as a constituent atom in addition to the cyclic structure formed of only carbon atoms. Further, the liquid component having the alicyclic structure including the hetero atom has only to such an alicyclic structure. In addition to that, the liquid component may be provided with a cyclic structure having an aromatic property (cyclic structure having pi-conjugated system). Further, in the invention, the liquid component having the alicyclic structure including the hetero atom means to have an alicyclic structure including a cyclic structure formed by a covalent bond in a molecule thereof, which include a hetero atom as atoms forming the cyclic structure, be in a liquid form as a simple substance at the room temperature (25° C.), and have no ultraviolet ray curing property.

Metal Powder

As described above, the ultraviolet ray curable ink composition of the invention contains the metal particles which are subjected to the surface treatment with the fluorine type silane compound and/or the fluorine type phosphoric acid ester as the surface treatment agent as the metal powder.

Base Particles

First, description will be made on base particles constituting the metal particles (particles to be subjected to the surface treatment with the surface treatment agent).

Each of the base particles constituting the metal particles may be constituted of a metal material in an area including at least the vicinity of a surface thereof. For example, the whole of the base particle may be constituted of the metal material. Alternatively, the base particle may be constituted from a base portion constituted of a non-metal material and a coated layer constituted of the metal material coating the base portion.

Further, examples of the metal material constituting the base particles included a metal as a simple substance, various kinds of alloys and the like. It is preferred that the base particles are constituted of Al in at least the vicinity of the surfaces thereof mainly. Al inherently shows especially excellent gloss among various kinds of metal materials. However, in the case where powder constituted from particles formed from Al is used in an ultraviolet ray curable ink composition, the present inventors have found that storage stability of the ultraviolet ray curable ink composition becomes particularly low, the ultraviolet ray curable ink composition is turned into a gel, and therefore the problems such as lowering of ejection stability of the ultraviolet ray curable ink composition due to viscosity increase thereof occur more remarkably. On the other hand, even if the powder constituted from the particles of which surfaces are constituted of Al is used in the invention, it is possible to reliably prevent the problems as described above from occurring. Specifically, in the metal powder constituting the ultraviolet ray curable ink composition, the metal particles, of which at least surfaces are constituted of Al as a main component thereof, are subjected to the surface treatment with the surface treatment agent (the fluorine type silane compound and/or the fluorine type phosphoric acid ester). This makes it possible to exhibit the effects of the invention conspicuously.

Further, the base particles may be produced by using any methods. In the case where at least the surfaces of the base particles are formed from Al, it is preferred that they are produced by forming a film made of Al on each particle by using a vapor phase film formation method, and then crushing the film. This makes it possible to more effectively express the gloss and the like which Al inherently has in the pattern (printed portion) formed by using the ultraviolet ray curable ink composition of the invention. Further, this also makes it possible to suppress variation among the base particles in property. Furthermore, by using such a method, it is possible to appropriately produce even relatively fine base particles.

In the case where the base particles are produced by using such a method, for example, by forming (film-forming) the film made of Al onto a base material (base), it is possible to appropriately produce the base particles. As the base material, for example, a plastic film such as polyethylene terephthalate can be used. Further, the base material may have a release agent layer provided on a film-formation surface thereof.

Furthermore, it is preferred that the crushing is carried out by subjecting the film to ultrasonic vibration in a liquid. This makes it possible to easily and reliably obtain the base particles having the particle size as described above and to suppress variation of the particles in a size, a shape and property from occurring.

Further, in the case where the crushing is carried out in the above method, as the above mentioned liquid, it is preferable to use: alcohols such as methanol, ethanol, propanol and butanol; hydrocarbon-based compounds such as n-heptane, n-octane, decane, dodecane, tetradecane, toluene, xylene, cymene, durene, indene, dipentene, tetrahydro naphthalene, decahydro naphthalene and cyclohexyl benzene; ether-based compounds such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxy ethane, bis(2-methoxy ethyl) ether and p-dioxane; polar compounds such as propylene carbonate, γ-butyrolactone, N-methyl-2-pyrolidone, N,N-dimethyl formamide (DMF), N,N-dimethyl acetamide (DMA), dimethyl sulfoxide, cyclohexanone and acetonitrile; and the like. By using such a liquid, it is possible to prevent undesirable oxidation and the like of the base particles and to further improve productivity of the base particles and the metal particles of the metal powder. Further, it is also possible to make the variation of the particles in the size, the shape and the property smaller.

Surface Treatment Agent

As described above, the metal particles of the metal powder according to the invention are subjected to the surface treatment with the fluorine type silane compound and/or the fluorine type phosphoric acid ester as the surface treatment agent.

First, description will be made on the fluorine type silane compound in the surface treatment agent.

Examples of the fluorine type silane compound include a silane compound having at least one fluorine atom in a molecule thereof.

As the fluorine type silane compound as the surface treatment agent, a compound having a chemical structure represented by the following formula (1) is especially preferable.

$$R^1SiX^1_aR^2_{(3-a)} \qquad (1)$$

In the above formula (1), "$R^1$" is a hydrocarbon group in which a part of hydrogen atoms or all hydrogen atoms are substituted with fluorine atom(s), "$X^1$" is a hydrolysable group, an ether group, a chloro group or a hydroxyl group, "$R^2$" is an alkyl group having carbon numbers in the range of 1 or more but 4 or less, and "a" is an integral number of 1 or more but 3 or less.

This makes it possible to improve the storage stability of the ultraviolet ray curable ink composition especially, and the gloss and the wear resistance of the printed portion of the printed object produced by using the ultraviolet ray curable ink composition.

Examples of "$R^1$" in the above formula (1) include an alkyl group, an alkenyl group, an aryl group, an aralkyl group and the like in which a part of hydrogen atoms or all hydrogen atoms are substituted with the fluorine atom(s). Further, at least a part of hydrogen atoms contained in a molecular structure of each of such groups (that is, hydrogen atoms not substituted with the fluorine atoms) may be substituted with an amino group, a carboxyl group, a hydroxyl group, a thiol group or the like. Furthermore, a carbon chain contained in each of the above groups may include a hetero atom such as —O—, —S—, —NH— or —N= or an aromatic ring such as benzene in a middle thereof. Concrete examples of "$R^1$" include a phenyl group, a benzyl group, a phenethyl group, a hydroxy phenyl group, a chloro phenyl group, an amino phenyl group, a naphthyl group, an anthranyl group, a pyrenyl group, a thienyl group, a pyrrolyl group, a cyclohexyl group, a cyclohexenyl group, a cyclopentyl group, a cyclopentenyl group, a pyridinyl group, a methyl group, an ethyl group, a n-propyl group, an isopropyl group, a n-butyl group, an isobutyl group, a sec-butyl group, a tert-butyl group, an octadecyl group, a n-octyl group, a chloro methyl group, a methoxy ethyl group, a hydroxy ethyl group, an amino ethyl group, a cyano group, a mercapto propyl group, a vinyl group, an allyl group, an acryloxy ethyl group, a methacryloxy ethyl group, a glycidoxy propyl group, an acetoxy group and the like, in which a part of the hydrogen atoms or all hydrogen atoms are substituted with the fluorine atom(s).

Examples of the fluorine type silane compound represented by the formula (1) include a compound having a structure in which a part of the hydrogen atoms or all hydrogen atoms included in the following silane compounds are substituted with the fluorine atom(s). Concrete examples of following silane compounds include dimethyl dimethoxy silane, diethyl diethoxy silane, 1-propenyl methyl dichloro silane, propyl dimethyl chloro silane, propyl methyl dichloro silane, propyl trichloro silane, propyl triethoxy silane, propyl trimethoxy silane, styryl ethyl trimethoxy silane, tetradecyl trichloro silane, 3-thiocyanate propyl triethoxy silane, p-tolyl dimethyl chloro silane, p-tolyl methyl dichloro silane, p-tolyl trichloro silane, p-tolyl trimethoxy silane, p-tolyl triethoxy silane, di-n-propyl di-n-propoxy silane, diisopropyl diisopropoxy silane, di-n-butyl di-n-butyloxy silane, di-sec-butyl di-sec-butyloxy silane, di-t-butyl di-t-butyloxy silane, octadecyl trichloro silane, octadecyl methyl diethoxy silane, octadecyl triethoxy silane, octadecyl trimethoxy silane, octadecyl dimethyl chloro silane, octadecyl methyl dichloro silane, octadecyl methoxy dichloro silane, 7-octenyl dimethyl chloro silane, 7-octenyl trichloro silane, 7-octenyl trimethoxy silane, octyl methyl dichloro silane, octyl dimethyl chloro silane, octyl trichloro silane, 10-undecenyl dimethyl chloro silane, undecyl trichloro silane, vinyl dimethyl chloro silane, methyl dodecyl dimethoxy silane, methyl dodecyl diethoxy silane, methyl octadecyl dimethoxy silane, methyl octadecyl diethoxy silane, n-octyl methyl dimethoxy silane, n-octyl methyl diethoxy silane, triacontyl dimethyl chloro silane, triacontyl trichloro silane, methyl trimethoxy silane, methyl triethoxy silane, methyl tri-n-propoxy silane, methyl triisopropoxy silane, methyl tri-n-butyloxy silane, methyl tri-sec-butyloxy silane, methyl tri-t-butyloxy silane, ethyl trimethoxy silane, ethyl triethoxy silane, ethyl tri-n-propoxy silane, ethyl tri-isopropoxy silane, ethyl-n-butyloxy silane, ethyl tri-sec-butyloxy silane, ethyl tri-t-butyloxy silane, n-propyl trimethoxy silane, isobutyl trimethoxy silane, n-hexyl trimethoxy silane, hexadecyl trimethoxy silane, n-octyl trimethoxy silane, n-dodecyl triethoxy silane, n-octadecyl trimethoxy silane, n-propyl triethoxy silane, isobutyl triethoxy silane, n-hexyl triethoxy silane, hexadecyl triethoxy silane, n-octyl triethoxy silane, n-dodecyl trimethoxy silane, n-octadecyl triethoxy silane, 2-[2-(trichloro silyl) ethyl]pyridine, 4-[2-(trichloro silyl) ethyl]pyridine, diphenyl dimethoxy silane, diphenyl diethoxy silane, 1,3-(trichloro silyl methyl) heptacosane, dibenzyl dimethoxy silane, dibenzyl diethoxy silane, phenyl trimethoxy silane, phenyl trimethyl dimethoxy silane, phenyl dimethyl methoxy silane, phenyl dimethoxy silane, phenyl diethoxy silane, phenyl methyl diethoxy silane, phenyl dimethyl ethoxy silane, benzyl triethoxy silane, benzyl trimethoxy silane, benzyl methyl dimethoxy silane, benzyl dimethyl methoxy silane, benzyl dimethoxy silane, benzyl diethoxy silane, benzyl methyl diethoxy silane, benzyl dimethyl ethoxy silane, benzyl triethoxy silane, dibenzyl dimethoxy silane, dibenzyl diethoxy silane, 3-acetoxy propyl trimethoxy silane, 3-acryloxy propyl trimethoxy silane, allyl trimethoxy silane, allyl triethoxy silane, 4-amino butyl triethoxy silane, (amino ethyl amino methyl) phenethyl trimethoxy silane, N-(2-amino ethyl)-3-amino propyl methyl dimethoxy silane, N-(2-amino ethyl)-3-amino propyl trimethoxy silane, 6-(amino hexyl amino propyl) trimethoxy silane, p-amino phenyl trimethoxy silane, p-amino phenyl ethoxy silane, m-amino phenyl trimethoxy silane, m-amino phenyl ethoxy silane, 3-amino propyl trimethoxy silane, 3-amino propyl triethoxy silane, ω-amino undecyl trimethoxy silane, amyl triethoxy silane, benzooxasilepin dimethyl ester, 5-(bicycloheptenyl) triethoxy silane, bis(2-hydroxy ethyl)-3-amino propyl triethoxy silane, 8-bromo octyl trimethoxy silane, bromo phenyl trimethoxy silane, 3-bromo propyl trimethoxy silane, n-butyl trimethoxy silane, 2-chloro methyl triethoxy silane, chloro methyl methyl diethoxy silane, chloro methyl methyl diisopropoxy silane, p-(chloro methyl) phenyl trimethoxy silane, chloro methyl triethoxy silane, chloro phenyl triethoxy silane, 3-chloro propyl methyl dimethoxy silane, 3-chloro propyl triethoxy silane, 3-chloro propyl trimethoxy silane, 2-(4-chloro sulfonyl phenyl) ethyl trimethoxy silane, 2-cyano ethyl triethoxy silane, 2-cyano ethyl trimethoxy silane, cyano methyl phenethyl triethoxy silane, 3-cyano propyl triethoxy silane, 2-(3-cyclohexenyl) ethyl trimethoxy silane, 2-(3-cyclohexenyl) ethyl triethoxy silane, 3-cyclohexenyl trichloro silane, 2-(3-cyclohexenyl) ethyl trichloro silane, 2-(3-cyclohexenyl) ethyl dimethyl chloro silane, 2-(3-cyclohexenyl) ethyl methyl dichloro silane, cyclohexyl dimethyl chloro silane, cyclohexyl ethyl dimethoxy silane, cyclohexyl methyl dichloro silane, cyclohexyl methyl dimethoxy silane, (cyclohexyl methyl) trichloro silane, cyclohexyl trichloro silane, cyclohexyl trimethoxy silane, cyclooctyl trichloro silane, (4-cyclooctenyl) trichloro silane, cyclopentyl trichloro silane, cyclopentyl trimethoxy silane, 1,1-diethoxy-1-silacyclopenta-3-en, 3-(2,4-dinitro phenyl amino) propyl triethoxy silane, (dimethyl chloro silyl) methyl-7,7-dimethyl norpinane, (cyclohexyl amino methyl) methyl diethoxy silane, (3-cyclopentadienyl propyl) triethoxy silane, N,N-diethyl-3-amino propyl) trimethoxy silane, 2-(3,4-epoxy cyclohexyl) ethyl trimethoxy silane, 2-(3,4-epoxy cyclohexyl) ethyl triethoxy silane, (furfuryl oxy methyl) triethoxy silane, 2-hydroxy-4-(3-triethoxy propoxy) diphenyl ketone, 3-(p-methoxy phenyl) propyl methyl dichloro silane, 3-(p-methoxy phenyl) propyl trichloro silane, p-(methyl phenethyl) methyl dichloro silane, p-(methyl phenethyl) trichloro silane, p-(methyl phenethyl) dimethyl chloro silane, 3-morpholino propyl trimethoxy silane, (3-glycidoxy propyl) methyl diethoxy silane, 3-glycidoxy propyl trimethoxy silane, 1,2,3,4,7,7-hexachloro-6-methyl diethoxy silyl-2-norbornene, 1,2,3,4,7,7-hexachloro-6-triethoxy silyl-2-norbornene, 3-iodo propyl trimethoxy silane, 3-isocyanate propyl triethoxy silane, (mercapto methyl) methyl diethoxy silane, 3-mercapto propyl methyl dimethoxy silane, 3-mercapto propyl dimethoxy silane, 3-mercapto propyl triethoxy silane, 3-methacryloxy propyl methyl diethoxy silane, 3-methacryloxy propyl trimethoxy silane, methyl {2-(3-trimethoxy silyl propyl amino) ethyl amino}-3-propionate, 7-octenyl trimethoxy silane, R—N-α-phenethyl-N'-triethoxy silyl propyl urea, S—N-α-phenethyl-N'-triethoxy silyl propyl urea, phenethyl trimethoxy silane, phenethyl methyl dimethoxy silane, phenethyl dimethyl methoxy silane, phenethyl dimethoxy silane, phenethyl diethoxy silane, phenethyl methyl diethoxy silane, phenethyl dimethyl ethoxy silane, phenethyl triethoxy silane, (3-phenyl propyl) dimethyl chloro silane, (3-phenyl propyl) methyl dichloro silane, N-phenyl amino propyl trimethoxy silane, N-(triethoxy silyl propyl) dansyl amide, N-(3-triethoxy silyl propyl)-4,5-dihydro imidazol, 2-(triethoxy silyl ethyl)-5-(chloro acetoxy) bicyclo heptane, (S)—N-triethoxy silyl propyl-O-menthocarbamate, 3-(triethoxy silyl propyl)-p-nitro benzamide, 3-(triethoxy silyl) propyl succinic anhydrate, N-[5-(trimethoxy silyl)-2-aza-1-oxo-pentyl]caprolactam, 2-(trimethoxy silyl ethyl) pyridine, N-(trimethoxy silyl ethyl) benzyl-N,N,N-trimethyl ammonium chloride, phenyl vinyl diethoxy silane, 3-thiocyanate propyl triethoxy silane, N-{3-(triethoxy silyl) propyl}phthalamic acid, 1-trimethoxy silyl-2-(chloro methyl) phenyl ethane, 2-(trimethoxy silyl) ethyl phenyl sulfonyl azide, β-trimethoxy silyl ethyl-2-pyridine, trimethoxy silyl propyl diethylene triamine, N-(3-trimethoxy silyl propyl) pyrrole, N-trimethoxy silyl propyl-N,N,N-tributyl ammonium bromide, N-trimethoxy silyl propyl-N,N,N-tributyl ammonium chloride, N-trimethoxy silyl propyl-N,N,N-trimethyl ammonium chloride, vinyl methyl diethoxy silane, vinyl triethoxy silane, vinyl trimethoxy silane, vinyl methyl dimethoxy silane, vinyl dimethyl methoxy silane, vinyl dimethyl ethoxy silane, vinyl methyl dichloro silane, vinyl phenyl dichloro silane, vinyl phenyl diethoxy silane, vinyl phenyl dimethyl silane, vinyl phenyl methyl chloro silane, vinyl triphenoxy silane, vinyl tris-t-butoxy silane, adamanthyl ethyl trichloro silane, allyl phenyl trichloro silane, (amino ethyl amino methyl) phenethyl trimethoxy silane, 3-amino phenoxy dimethyl vinyl silane, phenyl trichloro silane, phenyl dimethyl chloro silane, phenyl methyl dichloro silane, benzyl trichloro silane, benzyl dimethyl chloro silane, benzyl methyl dichloro silane, phenethyl diisopropyl chloro silane, phenethyl trichloro silane, phenethyl dimethyl chloro silane, phenethyl methyl dichloro silane, 5-(bicyclo heptenyl) trichloro silane, 5-(bicycloheptenyl) triethoxy silane, 2-(bicycloheptyl) dimethyl chloro silane, 2-(bicycloheptyl) trichloro silane, 1,4-bis(trimethoxy silyl ethyl) benzene, bromo phenyl trichloro silane, 3-phenoxy propyl dimethyl chloro silane, 3-phenoxy propyl trichloro silane, t-butyl phenyl chloro silane, t-butyl phenyl methoxy silane, t-butyl phenyl dichloro silane, p-(t-butyl) phenethyl dimethyl chloro silane, p-(t-butyl) phenethyl trichloro silane, 1,3-(chloro dimethyl silyl methyl) heptacosane, ((chloro methyl) phenyl ethyl) dimethyl chloro silane, ((chloro methyl) phenyl ethyl) methyl dichloro silane, ((chloro methyl) phenyl ethyl) trichloro silane, ((chloro methyl) phenyl ethyl) trimethoxy silane, chloro phenyl trichloro silane, 2-cyano ethyl trichloro silane, 2-cyano ethyl methyl dichloro silane, 3-cyano propyl methyl diethoxy silane, 3-cyano propyl methyl dichloro silane, 3-cyano propyl methyl dichloro silane, 3-cyano propyl dimethyl ethoxy silane, 3-cyano propyl methyl dichloro silane, 3-cyano propyl trichloro silane, and the like.

Further, it is preferred that the fluorine type silane compound (surface treatment agent) has a perfluoro alkyl structure ($C_nF_{2n+1}$). This makes it possible to further improve the storage stability of the ultraviolet ray curable ink composition especially, and to make the gloss and the wear resistance of the printed portion of the printed object produced by using the ultraviolet ray curable ink composition more excellent.

Examples of the fluorine type silane compound having such a perfluoro alkyl structure ($C_nF_{2n+1}$) include a compound represented by the following formula (3).

$$C_nF_{2n+1}(CH_2)_mSiX^1{}_aR^2{}_{(3-a)} \quad (3)$$

In the above formula (3), "$X^1$" is a hydrolysable group, an ether group, a chloro group or a hydroxyl group, "$R^2$" is an alkyl group having carbon numbers in the range of 1 or more but 4 or less, "n" is an integral number in the range of 1 or more but 14 or less, "m" is an integral number in the range of 2 or more but 6 or less, and "a" is an integral number in the range of 1 or more but 3 or less.

Concrete examples of the compound having such a structure include $CF_3$—$CH_2CH_2$—$Si(OCH_3)_3$, $CF_3(CF_2)_3$—$CH_2CH_2$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(OCH_3)_3$, $CF_3(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, $CF_3(CF_2)_8$—$CH_2CH_2$—$Si(C_2H_5)(OC_2H_5)_2$, and the like.

Further, as the fluorine type silane compound, a compound having a perfluoro alkyl ether structure ($C_nF_{2n+1}O$) instead of the above mentioned perfluoro alkyl structure ($C_nF_{2n+1}$) also can be used.

Examples of the fluorine type silane compound having such a perfluoro alkyl ether structure ($C_nF_{2n+1}O$) include a compound represented by the following formula (4).

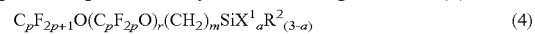

$$C_pF_{2p+1}O(C_pF_{2p}O)_r(CH_2)_mSiX^1{}_aR^2{}_{(3-a)} \quad (4)$$

In the above formula (4), "$X^1$" is a hydrolysable group, an ether group, a chloro group or a hydroxyl group, "$R^2$" is an alkyl group having carbon numbers in the range of 1 or more but 4 or less, "p" is an integral number in the range of 1 or more but 4 or less, "r" is an integral number in the range of 1 or more but 10 or less, "m" is an integral number in the range of 2 or more but 6 or less, and "a" is an integral number in the range of 1 or more but 3 or less.

Concrete examples of the compound having such a structure include $CF_3O(CF_2O)_6$—$CH_2CH_2$—$Si(OC_2H_5)_3$, $CF_3O(C_3F_6O)_4$—$CH_2CH_2$—$Si(OCH_3)_3$, $CF_3O(C_3F_6O)_2(CF_2O)_3$—$CH_2CH_2$—$Si(OCH_3)_3$, $CF_3O(C_3F_6O)_8$—$CH_2CH_2$—$Si(OCH_3)_3$, $CF_3O(C_4F_9O)_5$—$CH_2CH_2$—$Si(OCH_3)_3$, $CF_3O(C_4F_9O)_5$—$CH_2CH_2$—$Si(CH_3)(OC_2H5)_2$, $CF_3O(C_3F_6O)_4$—$CH_2CH_2$—$Si(C_2H_5)(OCH_3)_2$, and the like.

Next, description will be made on a fluorine type phosphoric acid ester in the surface treatment agent in detail.

As the fluorine type phosphoric acid ester, a phosphoric acid ester having at least one fluorine atom in a molecule thereof can be used.

In particular, it is preferred that the ultraviolet ray curable ink composition of the invention includes the metal powder constituted from the metal particles which are subjected to the surface treatment with the fluorine type phosphoric acid ester having a chemical structure represented by the following formula (2).

$$POR_n(OH)_{3-n} \quad (2)$$

where in the above formula (2), "R" is $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, "n" is an integral number in the range of 1 or more but 3 or less, "m" is an integral number in the range of 5 or more but 17 or less, and "l" is an integral number in the range of 1 or more but 12 or less.

This makes it possible to improve the storage stability of the ultraviolet ray curable ink composition especially, and the gloss and the wear resistance of the printed portion of the printed object produced by using the ultraviolet ray curable ink composition.

In the above formula (2), "m" is preferably the integral number in the range of 5 or more but 17 or less, and more preferably the integral number in the range of 7 or more but 12 or less. This makes it possible to more remarkably exhibit the above mentioned effects.

Further, in the above formula (2), "l" is preferably the integral number in the range of 1 or more but 12 or less, and more preferably the integral number in the range of 1 or more but 10 or less. This makes it possible to more remarkably exhibit the above mentioned effects.

Further, it is preferred that the ultraviolet ray curable ink composition of the invention includes the metal powder constituted from the metal particles which are subjected to the surface treatment with the fluorine type phosphoric acid ester represented by $CF_3(CF_2)_5(CH_2)_2O(P)(OH)_2$ and/or $CF_3(CF_2)_5(CH_2)_2O(P)(OH)(OCH_2CH_3)$.

This ensures that the metal particles of the metal powder are subjected to the surface treatment reliably and sufficiently. As a result, it is possible to improve the chemical stability and the dispersion stability of the metal particles of the metal powder in the ultraviolet ray curable ink composition and make the storage stability and the ejection stability for a long period of time of the ultraviolet ray curable ink composition excellent. Further, in the printed object produced by using the ultraviolet ray curable ink composition, it is possible to reliably arrange the metal particles of the metal powder at the vicinity of the outer surface of the printed portion, thereby to efficiently exhibit the characteristics such as the gloss which are inherently possessed by the metal material of the metal particles constituting the metal powder. Further, even if a polymerizable compound having low surface tension is used as a constituent material of the ultraviolet ray curable ink composition, it is possible to reliably arrange the metal particles of the metal powder at the vicinity of the outer surface of the printed portion in the printed object produced by using the ultraviolet ray curable ink composition. Consequently, it is possible to efficiently exhibit the characteristics such as the gloss which are inherently possessed by the metal material of the metal particles constituting the metal powder.

Further, it is preferred that the fluorine type phosphoric acid ester (surface treatment agent) has a perfluoro alkyl structure ($C_nF_{2n+1}$). This makes it possible to improve the storage stability of the ultraviolet ray curable ink composition especially, and the gloss and the wear resistance of the printed portion of the printed object produced by using the ultraviolet ray curable ink composition.

The base particles may be directly subjected to the surface treatment with the surface treatment agent (the fluorine type silane compound, fluorine type phosphoric acid ester) as described above, but may be preferably subjected to a treatment with an acid or a base, and then the subjected base particles may be preferably subjected the surface treatment with the above surface treatment agent (fluorine type silane compound and fluorine type phosphoric acid ester). This makes it possible to reliably modify the surfaces of the base particles with the above surface treatment agent (fluorine type silane compound and/or fluorine type phosphoric acid ester) due to a chemical bonding thereof, thereby exhibiting the above mentioned effects of the invention in a more effective manner. Examples of the acid include a proton acid such as hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid, hypophosphorous acid and the like. Among them, it is preferably the hydrochloric acid, the phosphoric acid and the acetic acid. On the other hand, examples of the base include sodium hydroxide, potassium hydroxide, calcium hydroxide and the like. Among them, it is preferably the sodium hydroxide and the potassium hydroxide.

Each of the metal particles of the metal powder may be of any shape such as a spherical shape, a fusiform shape or a needle shape, but is preferably of a scaly shape. This makes it possible to arrange the metal particle of the metal powder on a recording medium, on which the ultraviolet ray curable ink composition is to be applied, so that a major surface of the metal particle of the metal powder are oriented along a surface shape of the recording medium. Therefore, it is also possible to more effectively exhibit the gloss and the like provided inherently by the metal material constituting the metal particles of the metal powder in the printed object to be produced, to thereby make the gloss and the high-grade sense of the pattern (printed portion) to be formed especially excellent. Further, in the case where the major surface of the metal particle of the metal powder is oriented along the surface shape of the recording medium, it is also possible to further improve the water resistance of the printed portion of the printed object. Furthermore, in the case where the metal particles are not subjected to the surface treatment with the fluorine type silane compound and/or the fluorine type phosphoric acid ester as described above, if each of the metal particles of the metal powder is of the scaly shape, the storage stability and the ejection stability of the ultraviolet ray curable ink composition are apt to be further remarkably lowered. In contrast, in the invention, even if each of the metal particles of the metal powder is of the scaly shape, it is possible to prevent such a problem from occurring reliably. In other words, in the case where each of the metal particles of the metal powder is of the scaly shape, the effects of the invention can be more remarkably exhibited.

In the invention, the scaly shape means a shape in which an area of the particle observed from a predetermined direction (that is, an area of each particle at a planar view thereof) is larger than an area of the particle observed from a direction orthogonal to the above observation direction, such as a plate shape or a curved plate shape. In particular, in the case where an area of the particle observed from a direction where a project area thereof becomes maximum (that is, an area of each particle at a planar view thereof) is defined as $S_1$ ($\mu m^2$) and an area of the particle observed from a direction where the area of the particle observed from directions orthogonal to the above observation direction becomes maximum is defined as $S_0$ ($\mu m^2$), especially, a ratio of $S_1$ to $S_0$ ($S_1/S_0$) is preferably 2 or more, more preferably 5 or more, and even more preferably 8 or more. For example, as the value of this ratio, an average value of the values of the ratios obtained by observing arbitrary 10 particles can be used.

An average particle size (thickness) of the metal particles of the metal powder is preferably in the range of 500 nm or more but 3.0 μm or less, and more preferably in the range of 800 nm or more but 1.8 μm or less. This makes it possible to further improve the gloss and the high-grade sense of the printed object to be produced by using the ultraviolet ray curable ink composition. Further, this also makes it possible to make the storage stability and the ejection stability of the ultraviolet ray curable ink composition more excellent.

An amount of the metal particles of the metal powder contained in the ultraviolet ray curable ink composition is preferably in the range of 0.5 mass % or more but 10.0 mass % or less, and more preferably in the range of 1.0 mass % or more but 5.0 mass % or less. In this regard, the ultraviolet ray curable ink composition may contain two or more kinds of powder as the metal powder. In this case, a total amount of them is preferably any value which falls within the above ranges.

Liquid Component Having Alicyclic Structure Including Hetero Atom

The ultraviolet ray curable ink composition of the invention contains a predetermined amount of the liquid component having the alicyclic structure including the hetero atom in addition to the metal powder as described above and the polymerizable compound described later.

The ultraviolet ray curable ink composition of the invention contains an amount in the range of 0.05 mass % or more but 7.0 mass % or less of the liquid component having the alicyclic structure including the hetero atom together with the metal powder of which metal particles are subjected to the surface treatment with the fluorine type silane compound and/or the fluorine type phosphoric acid ester as the surface treatment agent, and the polymerizable compound.

This makes it possible to improve the storage stability of the ultraviolet ray curable ink composition especially, and the gloss of the printed portion of the printed object produced by using the ultraviolet ray curable ink composition.

The reason why such excellent effects are obtained is as follows. By including the metal powder of which metal particles are subjected to the surface treatment with the fluorine type silane compound and/or the fluorine type phosphoric acid ester, in the ultraviolet ray curable ink composition applied onto the recording medium, it is possible to reliably arrange the metal particles of the metal powder at the vicinity of the outer surface of the recording medium, so that the metal particles of the metal powder arrange at the vicinity of an outer surface of a printed portion in the finally obtained printed object reliably. Therefore, it is possible to obtain excellent gloss of the printed object (printed portion). Further, by containing the predetermined amount of the liquid component having the alicyclic structure including the hetero atom in the ultraviolet ray curable ink composition, it is possible to reliably improve the dispersion stability of the metal powder of which metal particles are subjected to the surface treatment with the fluorine type silane compound and/or the fluorine type phosphoric acid ester. As a result, it is possible to reliably prevent the metal particles of the metal powder from aggregating and settling in the ultraviolet ray curable ink composition for a long period of time. By acting synergistically on the effects, it is possible to improve the storage stability of the ultraviolet ray curable ink composition especially, and the gloss of the printed portion of the printed object produced by using the ultraviolet ray curable ink composition.

The excellent effects as described above are obtained by containing the predetermined amount of the liquid component having the alicyclic structure including the hetero atom together with the metal powder constituted of the metal particles which are subjected to the surface treatment with the fluorine type silane compound and/or the fluorine type phosphoric acid ester in the ultraviolet ray curable ink composition. In the case where one of the metal powder and the liquid component is not contained in the ultraviolet ray curable ink composition, the excellent effects as described above are not obtained.

In the case where the metal powder of which metal particles are subjected to the surface treatment with the fluorine type silane compound and/or the fluorine type phosphoric acid ester is contained, but the liquid component having the alicyclic structure including the hetero atom is not contained in the ultraviolet ray curable ink composition, or the amount of the liquid component having the alicyclic structure including the hetero atom is lower than a predetermined value, it is possible to reliably arrange the metal particles of the metal powder at the vicinity of outer surfaces of droplets of the ultraviolet ray curable ink composition. However, the dispersibility of the metal powder in the ultraviolet ray curable ink composition is lowered conspicuously, thereby making the droplet ejection by the ink jet method conspicuously unstable. In this case, the ejection stability of the droplets of the ultraviolet ray curable ink composition is lowered with time conspicuously, so that it becomes difficult or impossible to perform the droplet ejection in relatively a short period of time.

On the other hand, in the case where the liquid component having the alicyclic structure including the hetero atom is contained, but the metal powder of which metal particles are subjected to the surface treatment with the fluorine type silane compound and/or the fluorine type phosphoric acid ester is not contained in the ultraviolet ray curable ink composition, the dispersibility of the metal powder are not lowered conspicuously. However, it becomes difficult to reliably arrange the metal particles of the metal powder at the vicinity of the outer surface of the recording medium in the ultraviolet ray curable ink composition applied onto the recording medium, so that it is not possible to obtain sufficiently the excellent gloss of the finally obtained printed object (printed portion) reliably.

Further, in the case where the amount of the liquid component having the alicyclic structure including the hetero atom contained in the ultraviolet ray curable ink composition exceeds the predetermined value, the curing property (velocity) at the time of curing with the ultraviolet ray are lowered and the wear resistance of the finally obtained printed object is also lowered.

In this regard, it is to be noted that the ultraviolet ray curable ink composition may contain two or more of the liquid component having the alicyclic structure including the hetero atom. In this case, a total amount of them may be any value which falls within the above ranges.

The amount of the liquid component having the alicyclic structure including the hetero atom contained in the ultraviolet ray curable ink composition is preferably in the range of 0.05 mass % or more but 7.0 mass % or less, more preferably in the range of 0.2 mass % or more but 5.0 mass % or less, and even more preferably in the range of 0.5 mass % or more but 4.0 mass % or less. This makes it possible to exhibit the effects of the invention as described above remarkably.

A molecular weight of the liquid component having the alicyclic structure including the hetero atom is preferably in the range of 40 or more but 200 or less, more preferably in the range of 60 or more but 180 or less, and even more preferably in the range of 90 or more but 160 or less. This makes it possible to exhibit the effects as described above remarkably. Such a liquid component, generally, has high volatile property, and can be removed with relatively ease in a process of producing the printed object. Therefore, by combining a heating process and the like with the process, it is possible to efficiently prevent adverse effects from generating due to the liquid component remaining in the finally obtained printed object.

Examples of the alicyclic structure including the hetero atom include an oxetane structure, a tetrahydrofuran (oxolan) structure, a dioxolan structure, a tetrahydropyran structure, a dioxane structure, a trioxane structure, an oxa bicycle hexane structure, a thiethane structure, a tetrahydro thiophene structure, a tetrahydro thiopyran structure, a dithiane structure, an azetidine structure, a pyrrolidine structure, a piperidine structure, an azo bicycle heptane structure, a quinuclidine structure, a lactone structure, a lactam structure, a cyclic urea structure, a cyclic carbonate structure, a cyclic urethane structure, and the like. The liquid component has preferably the lactone structure and/or the lactam structure. This makes it possible to improve the storage stability of the ultraviolet ray curable ink composition especially, and the gloss of the printed portion of the printed object produced by using the ultraviolet ray curable ink composition.

In the alicyclic structure including the hetero atom, the number of atoms constituting the cyclic structure formed by the covalent bonds in the molecule thereof is preferably in the range of 5 or more but 8 or less, more preferably in the range of 5 or more but 6 or less, and even more preferably 5 (five-membered ring). This makes it possible to improve the storage stability of the ultraviolet ray curable ink composition especially, and the gloss of the printed portion of the printed object produced by using the ultraviolet ray curable ink composition.

In the alicyclic structure including the hetero atom, the number of the hetero atom constituting a nucleus (the cyclic structure formed by the covalent bonds in the molecule thereof) is preferably 3 or less, more preferably 2 or less (for example, γ-butyrolactone, γ-valerolactone, γ-nonalactone, N-methylpyrrolidone, N-ethylpyrrolidone, tetrahydrofurane, piperidine, 1,3-dioxane-2-on, 2-oxazolidinone, propylene carbonate, and the like), and even more preferably 1 (for example, γ-butyrolactone, γ-valerolactone, γ-nonalactone, N-methylpyrrolidone, N-ethylpyrrolidone, tetrahydrofurane, piperidine, and the like). This makes it possible to improve the storage stability of the ultraviolet ray curable ink composition especially, and the gloss of the printed portion of the printed object produced by using the ultraviolet ray curable ink composition.

Examples of the liquid component having the alicyclic structure including the hetero atom includes γ-butyrolactone, N-methylpyrrolidone, 1,3-dimethyl-2-imidazolidinone, 1,3-dioxane-2-on, 2-oxazolidinone, propylene carbonate, γ-valerolactone, γ-nonalactone, M-ethylpyrrolidone, tetrahydrofurane, piperidine, and the like. Among them, the liquid component is preferably γ-butyrolactone, N-methylpyrrolidone, 1,3-dimethyl-2-imidazolidinone, 1,3-dioxane-2-on, 2-oxazolidinone, and tetrahydrofurane, and more preferably γ-butyrolactone and N-methylpyrrolidone. This makes it possible to improve the storage stability of the ultraviolet ray curable ink composition especially, and the gloss of the printed portion of the printed object produced by using the ultraviolet ray curable ink composition. Further, such a liquid component, generally, has high volatile property, and can be removed with ease in the process of producing the printed object. Therefore, it is possible to more reliably prevent the adverse effects from generating due to the liquid component remaining in the finally obtained printed object.

Polymerizable Compound

A polymerizable compound is a component capable of being cured due to polymerization thereof by being irradiated with an ultraviolet ray. By containing such a component, it is possible to improve the wear resistance, the water resistance, the solvent resistance and the like of the printed object to be produced by using the ultraviolet ray curable ink composition.

The polymerizable compound is of a liquid state, and preferably functions as a dispersion medium capable of dispersing the metal powder in the ultraviolet ray curable ink composition. Even if an amount of the polymerizable compound is relatively high, it is possible to lower a viscosity of the ultraviolet ray curable ink composition, thereby especially improving the ejection stability of the droplets by the ink jet method. Furthermore, by containing the polymerizable compound, it is also possible to improve adhesion of the printed portion of the printed object to be formed by using the ultraviolet ray curable ink composition with respect to various kinds of recording media (base). In other words, by containing the polymerizable compound, the ultraviolet ray curable ink composition can exhibit excellent media responsibility.

The polymerizable compound has only to be a component capable of being polymerized by ultraviolet ray irradiation. As such a polymerizable compound, various kinds of monomers and various kinds of oligomers (including a dimmer, a trimmer and the like) can be used. It is preferred that the ultraviolet ray curable ink composition contains at least a monomer component as the polymerizable compound. Since the monomer is a component having generally a viscosity lower than that of the olygomer component or the like, the use of the monomer is advantageous in that the ejection stability of the ultraviolet ray curable ink composition can make especially excellent.

In particular, it is preferred that a monomer having an alicyclic structure is contained as the polymerizable compound in the ultraviolet ray curable ink composition of the invention. By containing the monomer having the alicyclic structure together with the metal powder, of which metal particles are subjected to the surface treatment with the fluorine type silane compound and/or the fluorine type phosphoric acid ester, and the liquid component having the alicyclic structure including the hetero atom, it is possible to improve the storage stability of the ultraviolet ray curable ink composition especially, and the gloss and the wear resistance of the printed portion of the printed object produced by using the ultraviolet ray curable ink composition.

The reason why such excellent effects are obtained is as follows. By containing the monomer having the alicyclic structure in the ultraviolet ray curable ink composition, it is possible to reliably improve the dispersion stability of the metal powder of which metal particles are subjected to the surface treatment with the fluorine type silane compound and/or the fluorine type phosphoric acid ester in the ultraviolet ray curable ink composition. As a result, it is possible to reliably prevent the metal particles of the metal powder from aggregating and settling in the ultraviolet ray curable ink composition for the long period of time. By acting synergistically on such effects and the effects obtained by containing both the metal powder of which metal particles are subjected to the surface treatment with the fluorine type silane compound and/or the fluorine type phosphoric acid ester and the liquid component having the alicyclic structure including the hetero atom, it is possible to improve the storage stability of the ultraviolet ray curable ink composition especially. Moreover, it is possible to improve the gloss and the wear resistance of the printed portion of the printed object produced by using the ultraviolet ray curable ink composition.

Examples of the monomer having the alicyclic structure include tris(2-(metha)acryloyloxy ethyl) isocyanurate, dicyclopentenyl oxyethyl (metha)acrylate, adamantyl (metha) acrylate, γ-butyrolactone (metha)acrylate, N-vinyl caprolactam, N-vinyl pyrrolidone, pentamethyl piperidyl (metha) acrylate, tetramethyl piperidyl (metha)acrylate, 2-methyl-2-adamantyl (metha)acrylate, 2-ethyl-2-adamantyl (metha) acrylate, mevalonic acid lactone (metha)acrylate, dimethylol tricyclodecane di(metha)acrylate, dimethylol dicyclopentane di(metha)acrylate, dicyclopentenyl (metha)acrylate, dicyclopentanyl (metha)acrylate, isobornyl (metha)acrylate, cyclohexyl (metha)acrylate, (metha)acryloyl morpholine, tetrahydrofurfuryl (metha)acrylate, phenyl glycidyl ether (metha)acrylate, EO modified water addition bisphenol A di(metha)acrylate, di(metha)acrylated isocyanurate, tri(metha)acrylated isocyanurate, and the like. It is preferred that the monomer includes one or more selected from the group consisting of tris(2-acryloyloxy ethyl) isocyanurate, dicyclopentenyl oxyethyl acrylate, adamantyl acrylate, γ-butyrolactone acrylate, N-vinyl caprolactam, N-vinyl pyrrolidone, pentamethyl piperidyl acrylate, tetramethyl piperidyl acrylate, 2-methyl-2-adamantyl acrylate, 2-ethyl-2-adamantyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, and tetrahydrofurfuryl acrylate. This makes it possible to further improve the gloss and the high-grade sense of the printed object to be produced by using the ultraviolet ray curable ink composition. Furthermore, it is possible to further improve the storage stability and the ejection stability of the ultraviolet ray curable ink composition.

Among them, in the case where the monomer includes one or more selected from the group consisting of acryloyl morpholine, tetrahydrofurfuryl acrylate, γ-butyrolactone acrylate, N-vinyl caprolactam, and N-vinyl pyrrolidone, it is possible to further improve the dispersion stability of the metal particles of the metal powder in the ultraviolet ray curable ink composition. In addition to that, in the printed object produced by using the ultraviolet ray curable ink composition, it is possible to reliably arrange the metal particles of the metal powder at the vicinity of the outer surface of the printed portion, so that it is possible to further improve the gloss of the obtained printed object.

From a point of view of further improving a curing rate of the ultraviolet ray curable ink composition at the time of irradiating with the ultraviolet ray and the productivity of the printed object, it is preferred that the monomer includes one or more selected from the group consisting of tris(2-acryloyloxy ethyl) isocyanurate, dicyclopentenyl oxyethyl acrylate, γ-butyrolactone acrylate, N-vinyl pyrrolidone, dimethylol tricyclodecane diacrylate, dimethylol dicyclopentane diacrylate, dicyclopentenyl acrylate, dicyclopentanyl acrylate, acryloyl morpholine, and tetrahydrofurfuryl acrylate. Moreover, the monomer includes more preferably acryloyl morpholine and/or γ-butyrolactone acrylate, and even more preferably γ-butyrolactone acrylate.

Further, in the case where the monomer includes cyclohexyl acrylate and/or tetrahydrofurfuryl acrylate, it is possible to further improve the flexibility of the printed portion formed by curing the ultraviolet ray curable ink composition.

From a point of view of further improving the wear resistance of the printed portion formed by curing the ultraviolet ray curable ink composition, it is preferred that the monomer includes one or more selected from the group consisting of tris(2-acryloyloxy ethyl) isocyanurate, dicyclopentenyl oxyethyl acrylate, adamantyl acrylate, γ-butyrolactone acrylate, N-vinyl caprolactam, N-vinyl pyrrolidone, dimethylol tricyclodecane diacrylate, dimethylol dicyclopentane diacrylate, dicyclopentenyl acrylate, dicyclopentanyl acrylate, isobornyl acrylate, and acryloyl morpholine. Moreover, the monomer includes more preferably γ-butyrolactone acrylate and/or N-vinyl caprolactam.

Further, in the case where the monomer includes one or more selected from the group consisting of γ-butyrolactone acrylate, N-vinyl caprolactam, N-vinyl pyrrolidone, isobornyl acrylate, and tetrahydrofurfuryl acrylate, it is possible to lower a shrinkage ratio of the ultraviolet ray curable ink composition at the time of curing. Consequently, it is possible to efficiently prevent the gloss of the printed portion from lowering due to occurrence of involuntary wrinkles on the printed portion formed by curing the ultraviolet ray curable ink composition.

An amount of the monomer having the alicyclic structure contained in the ultraviolet ray curable ink composition is preferably in the range of 40 mass % or more but 90 mass % or less, more preferably in the range of 50 mass % or more but 88 mass % or less, and even more preferably in the range of 55 mass % or more but 85 mass % or less. This makes it possible to improve the dispersion stability of metal particles of metal powder especially, and therefore obtain the ejection stability of the ultraviolet ray curable ink composition for the long period of time. In particular, even if the ultraviolet ray curable ink composition does not contain a dispersant, the excellent effects as described above are obtained. In contrast, if the amount of the monomer having the alicyclic structure contained in the ultraviolet ray curable ink composition is smaller than the lower limit value noted above, there is a possibility that the dispersion stability of the metal powder of which metal particles are subjected to the surface treatment with the fluorine type silane compound and/or the fluorine type phosphoric acid ester is lowered, so that the stability of the droplet ejection by the ink jet method is lowered. Further, in this case, there is a possibility that the stability over time of the droplet ejection of the ultraviolet ray curable ink composition is also lowered. Further, if the amount of the monomer having the alicyclic structure contained in the ultraviolet ray curable ink composition exceeds the upper limit value noted above, there are the following possibilities. An amount of the metal powder existing in the ultraviolet ray curable ink composition applied onto the recording medium is increased by excess improvement of the dispersion stability of the metal powder. Therefore, it is difficult to reliably arrange the metal particles of the metal powder at the vicinity of the outer surface of the ultraviolet ray curable ink composition applied onto the recording medium. Thus, it becomes difficult to obtain enough excellent gloss of the finally obtained printed object (printed portion). In this regard, the ultraviolet ray curable ink composition may contain two or more kinds of compounds as the monomer having the alicyclic structure. In this case, a total amount of them is preferably any value which falls within the above ranges.

In the monomer having the alicyclic structure, the number of atoms constituting the cyclic structure formed by the covalent bonds is preferably 5 or more, and more preferably 6 or more. This makes it possible to obtain the ultraviolet ray curable ink composition having excellent storage stability.

It is preferred that the ultraviolet ray curable ink composition contains a monofunctional monomer including a hetero atom in an aliciclic structure (monofunctional monomer including a hetero ring having no aromatic property) as the monomer having the alicyclic structure. This makes it possible to provide excellent dispersion stability of metal particles of metal powder, and therefore obtain the ejection stability of the ultraviolet ray curable ink composition for the long period of time. In particular, even if the ultraviolet ray curable ink composition does not contain the dispersant, the excellent effects as described above are obtained. The reason why the monomer having the alicyclic structure makes the dispersion stability of the metal powder improve is unclear. However, the inventors consider the reason why the hetero atom of the alicyclic structure has an appropriate affinity with respect to the surfaces of the metal particles, which are modified by a fluorine atom, of the metal powder. Examples of such a monofunctional monomer include tris (2-(metha)acryloyloxy ethyl) isocyanurate, γ-butyrolactone (metha)acrylate, N-vinyl caprolactam, N-vinyl pyrrolidone, pentamethyl piperidyl (metha)acrylate, tetramethyl piperidyl (metha)acrylate, mevalonic acid lactone (metha)acrylate, (metha)acryloyl morpholine, tetrahydrofurfuryl (metha)acrylate, and the like.

An amount of the monofunctional monomer contained in the ultraviolet ray curable ink composition (monofunctional monomer including the hetero atom in the alicyclic structure) is preferably in the range of 10 mass % or more but 80 mass % or less, and more preferably in the range of 15 mass % or more but 75 mass % or less. This makes it possible to suppress cure shrinkage of the ultraviolet ray curable ink composition, thereby obtaining the ultraviolet ray curable ink composition in which the metal particles are scattered in a small amount thereof. Consequently, it is possible to reliably use the ultraviolet ray curable ink composition for producing the printed object provided with the pattern (printed portion) having excellent gloss. In this regard, the ultraviolet ray curable ink composition may contain two or more kinds of compounds as the monofunctional monomer including the hetero atom in the alicyclic structure. In this case, a total amount of them is preferably any value which falls within the above ranges.

In the invention, the polymerizable compound constituting the ultraviolet ray curable ink composition may include a monomer having no alicyclic structure.

Examples of such a monomer (monomer having no alicyclic structure) include one or more selected from the group consisting of phenoxy ethyl (metha)acrylate, 2-(2-vinyloxy ethoxy) ethyl (metha)acrylate, dipropylene glycol di(metha)acrylate, tripropylene glycol di(metha)acrylate, 2-hydroxy-3-phenoxy propyl (metha)acrylate, 4-hydroxy butyl (metha)acrylate, laury (metha)acrylate, 2-methoxy ethyl (metha)acrylate, isooctyl (metha)acrylate, stearyl (metha)acrylate, 2-ethoxy ethyl (metha)acrylate, benzyl (metha)acrylate, 1H,1H,5H-octafluoro pentyl (metha)acrylate, 2-hydroxy ethyl (metha)acrylate, 2-hydroxy propyl (metha)acrylate, isobutyl (metha)acrylate, t-butyl (metha)acrylate, ethyl carbitol (metha)acrylate, 2,2,2-trifluoro ethyl (metha)acrylate, 2,2,3,3-tetrafluoro propyl (metha)acrylate, methoxy triethylene glycol (metha)acrylate, PO-modified nonyl phenol (metha)acrylate, EO-modified nonyl phenol (metha)acrylate, EO-modified 2-ethyl hexyl (metha)acrylate, phenoxy diethylene glycol (metha)acrylate, EO-modified phenol (metha)acrylate, EO-modified cresol (metha)acrylate, methoxy polyethylene glycol (metha)acrylate, dipropylene glycol (metha)acrylate, 2-n-butyl-2-ethyl-1,3-propanediol di(metha)acrylate, tetraethylene glycol di(metha)acrylate, 1,9-nonanediol di(metha)acrylate, 1,4-butanediol di(metha)acrylate, bisphenol A EO-modified di(metha)acrylate, 1,6-hexanediol di(metha)acrylate, polyethylene glycol 200 di(metha)acrylate, polyethylene glycol 300 di(metha)acrylate, neopentyl glycol hydroxyl pivalate di(metha)acrylate, 2-ethyl-2-butyl-propanediol di(metha)acrylate, polyethylene glycol 400 di(metha)acrylate, polyethylene glycol 600 di(metha)acrylate, polypropylene glycol di(metha)acrylate, bisphenol A EO-modified di(metha)acrylate, PO-modified bisphenol A di(metha)acrylate, trimethylol propane tri(metha)acrylate, pentaerythritol tri(metha)acrylate, trimethylol propane EO-modified tri(metha)acrylate, glycerine PO-added tri(metha)acrylate, tris(metha)acryloyl oxy ethyl phosphate, pentaerythritol tetra(metha)acrylate, PO-modified trimethylol propane tri(metha)acrylate, 2-(metha)acryloyloxy ethylphtalate, 3-(metha)acryloyloxy propylacrylate, w-carboxy (metha)acryloyloxy ethylphtalate, ditrimethylol propane tetra(metha)acrylate, dipentaerythritol penta/hexa(metha)acrylate, dipentaerythritol hexa(metha)acrylate, and the like. It is preferred that the monomer includes one or more selected the group consisting of phenoxy ethyl acrylate, 2-(2-vinyloxy ethoxy) ethyl acrylate, dipropylene glycol diacrylate, tripropylene glycol diacrylate, 2-hydroxy-3-phenoxy propyl acrylate, and 4-hydroxy butyl acrylate. The inclusion of such a monomer having no alicyclic structure in addition to the monomer having the alicyclic structure makes it possible to improve the storage stability and the ejection stability of the ultraviolet ray curable ink composition especially. As are result, it is possible to obtain excellent reactivity of the ultraviolet ray curable ink composition after the ejection by the ink jet method. Further, it is possible to improve the productivity of the printed object especially. Consequently, it is possible for the pattern to be formed to exhibit excellent wear resistance.

Among them, in the case where the monomer include phenoxy ethyl acrylate, in the printed object produced by using the ultraviolet ray curable ink composition, it is possible to reliably arrange the metal particles of the metal powder at the vicinity of the outer surface of the printed portion, so that it is possible to obtain the excellent gloss of the printed portion in the obtained printed object reliably.

Further, in the case where the monomer includes 2-(2-vinyloxy ethoxy) ethyl acrylate, it is possible to improve a curing rate of the ultraviolet ray curable ink composition when the ultraviolet ray is irradiated it and the productivity of the printed object.

Further, in the case where the monomer includes phenoxy ethyl acrylate and/or 2-hydroxy-3-phenoxy propyl acrylate, it is possible to improve flexibility of the printed portion formed by curing the ultraviolet ray curable ink composition.

From a point of view of further improving the wear resistance of the printed portion of the printed object formed by curing the ultraviolet ray curable ink composition, it is preferred that the monomer includes one or more selected from the group consisting of 2-(2-vinyloxy ethoxy) ethyl acrylate, dipropylene glycol diacrylate, and tripropylene glycol diacrylate. Moreover, the monomer includes more preferably 2-(2-vinyloxy ethoxy) ethyl acrylate.

Further, in the case where the monomer includes phenoxy ethyl acrylate, it is possible to lower a shrinkage ratio of the ultraviolet ray curable ink composition at the time of curing. Consequently, it is possible to efficiently prevent the gloss of the printed portion from lowering due to occurrence of involuntary wrinkles on the printed portion of the printed object formed by curing the ultraviolet ray curable ink composition.

An amount of a monomer other than the monomer having the alicyclic structure contained in the ultraviolet ray curable ink composition is preferably in the range of 5 mass % or more but 50 mass % or less, and more preferably in the range of 10 mass % or more but 40 mass % or less. This ensures that it becomes easy to adjust the curing rate of the ultraviolet ray curable ink composition, flexibility, the shrinkage ratio of the ultraviolet ray curable ink composition at the time of curing, and the like. In this regard, the ultraviolet ray curable ink composition may contain two or more kinds of compounds as the monomer having no alicyclic structure. In this case, a total amount of them is preferably any value which falls within the above ranges.

The ultraviolet ray curable ink composition may contain an oligomer (including a dimer, a trimer and the like), a prepolymer and the like other than the monomer as the polymerizable compound. As the oligomer and the prepolymer, for example, ones having the monomer as described above as a constituent component are used. It is preferred that the ultraviolet ray curable ink composition contains a multifunctional oligomer in particular. This makes it possible to especially improve the storage stability of the ultraviolet ray curable ink composition and the wear resistance and the like of the pattern to be formed especially. As the oligomer, an urethane oligomer in which the repeating units are urethane units or an epoxy oligomer in which the repeating units are epoxy units can be preferably used.

An amount of the polymerizable compound contained in the ultraviolet ray curable ink composition is preferably in the range of 70 mass % or more but 99 mass % or less, and more preferably in the range of 80 mass % or more but 98 mass % or less. This makes it possible to especially improve the storage stability, the ejection stability and the curing property of the ultraviolet ray curable ink composition especially, and the wear resistance and the like of the printed object to be produced by using the ultraviolet ray curable ink composition. In this regard, it is to be noted that the ultraviolet ray curable ink composition may contain two or more kinds of compounds as the polymerizable compound. In this case, it is preferred that a total amount of these compounds is set to a value falling within the above range.

Alcohol Component

The ultraviolet ray curable ink composition of the invention may contain an alcohol component having a carbon number in the range of 2 or more but 4 or less in addition to the metal powder, the polymerizable compound and the liquid component having the alicyclic structure including the hetero atom as described above. This makes it possible to further improve the storage stability of the ultraviolet ray curable ink composition especially, and the gloss of the printed portion of the printed object produced by using the ultraviolet ray curable ink composition.

An amount of an alcohol compound (alcohol component having the carbon number in the range of 2 or more but 4 or less) contained in the ultraviolet ray curable ink composition is preferably in the range of 0.05 mass % or more but 7.0 mass % or less, more preferably in the range of 0.2 mass % or more but 5.0 mass % or less, and even more preferably in the range of 0.5 mass % or more but 4.0 mass % or less. This makes it possible to exhibit the effects as described above conspicuously. In this regard, it is to be noted that the ultraviolet ray curable ink composition may contain two or more kinds of alcohol components having the carbon number in the range of 2 or more but 4 or less. In this case, it is preferred that a total amount of these compounds is set to a value falling within the above range.

A molecular weight of the alcohol component having the carbon number in the range of 2 or more but 4 or less is preferably in the range of 46 or more but 100 or less, more preferably in the range of 46 or more but 74 or less, and even more preferably in the range of 46 or more but 60 or less. This makes it possible to exhibit the effects as described above conspicuously.

A boiling point of the alcohol component having the carbon number in the range of 2 or more but 4 or less (boiling point under 1 atom) is preferably in the range of 78° C. or more but 117° C. or less, more preferably in the range of 78° C. or more but 100° C. or less, and even more preferably in the range of 78° C. or more but 83° C. or less. This makes it possible to exhibit the effects as described above conspicuously.

Examples of the alcohol component having the carbon number in the range of 2 or more but 4 or less include ethanol, 1-propanol, 2-propanol, 1-butanol, 2-butanol, 2-methyl-1-propanol, 2-methyl-2-propanol, 1,2-ethanediol, 1,2-propanediol, 1,3-propanediol, 1,2-buthanediol, 1,3-buthanediol, 1,4-buthanediol, 2,3-buthanediol, 2-methyl-1, 2-propanediol, 2-methyl-1,3-propanediol, 1,2,3-propanetriol, 1,2,3-buthanetriol, 1,2,4-buthanetriol, 2-methyl-1,2,3-propanetriol, 2-hydroxymethyl-1,3-propanediol, 1,2,3,4-buthanetetraol, compounds in which at least a part of the hydrogen atoms of the above compounds is substituted with a halogen atom or an amino group, and the like. Among them, the alcohol component is preferably ethanol and 2-propanol. If the ultraviolet ray curable ink composition contains ethanol and/or 2-propanol as the alcohol compound, it is possible to improve the storage stability of the ultraviolet ray curable ink composition especially. Further, it is possible to improve the ejection stability of the ultraviolet ray curable ink composition especially. Therefore, since it is possible to efficiently remove the alcohol component at the time of producing the printed object using the ultraviolet ray curable ink composition, it is possible to further improve the productivity of the printed object over the long period of time. Moreover, it is possible to reliably prevent adverse effects from generating due to the alcohol component remaining in the printed object.

Polyether Based Solvent

The ultraviolet ray curable ink composition of the invention may contain a polyether based solvent in addition to the metal powder, the polymerizable compound, and the liquid component having the alicyclic structure including the hetero atom as described above. This makes it possible to improve the storage stability of the ultraviolet ray curable ink composition and the gloss of the printed portion of the printed object produced by using the ultraviolet ray curable ink composition.

In the invention, it is to be noted that the polyether based solvent means one that has a plurality of ether groups (ether oxygens) in the molecule thereof, is in a liquid form as a simple substance at room temperature (25° C.), and has no ultraviolet ray curing property.

An amount of the polyether based solvent contained in the ultraviolet ray curable ink composition is preferably in the range of 0.05 mass % or more but 7.0 mass % or less, more preferably in the range of 0.2 mass % or more but 5.0 mass % or less, and even more preferably in the range of 0.5 mass % or more but 4.0 mass % or less. This makes it possible to exhibit the effects as described above conspicuously. In this regard, it is to be noted that the ultraviolet ray curable ink composition may contain two or more kinds of polyether based solvents. In this case, it is preferred that a total amount of them is set to a value falling within the above range.

A molecular weight of the polyether based solvent is preferably in the range of 40 or more but 250 or less, more preferably in the range of 60 or more but 230 or less, and even more preferably in the range of 90 or more but 200 or less. This makes it possible to exhibit the effects as described above conspicuously. Such a polyether based solvent, generally, has high volatile property, and can be removed with relatively ease in the process of producing the printed object. Therefore, by combining the heating process and the like with the process, it is possible to efficiently prevent the adverse effects from generating due to the liquid component remaining in the finally obtained printed object.

It is preferred that the ultraviolet ray curable ink composition contains a compound represented by the following formula (10) as the polyether based solvent.

(10)

where in the formula (10), each of "$R^1$" and "$R^2$" is independently an alkyl group having a long chain including a carbon number in the range of 1 or more but 4 or less or a hydrogen atom, "n" is an integer in the range of 1 or more but 4 or less. In the case where one of "$R^1$" and "$R^2$" is the hydrogen atom, "n" is an integer in the range of 2 or more but 4 or less. On the other hand, in the case where both "$R^1$" and "$R^2$" are the hydrogen atom, "n" is 3 or 4.

This makes it possible to improve the storage stability of the ultraviolet ray curable ink composition especially, and the gloss of the printed portion of the printed object produced by using the ultraviolet ray curable ink composition. Such a polyether based solvent, generally, has the high volatile property, and can be removed with relatively ease in the process of producing the printed object. Therefore, it is possible to efficiently prevent the adverse effects from generating due to the polyether based solvent remaining in the finally obtained printed object.

It the formula (10), although each of "$R^1$" and "$R^2$" may be independently the alkyl group having the long chain including the carbon number in the range of 1 or more but 4 or less, the carbon number is preferably in the range of 2 or more but 4 or less, and more preferably 2. This makes it possible to exhibit the effects as described above conspicuously.

It the formula (10), although "n" may be the integer in the range of 1 or more but 4 or less, "n" is preferably in the range of 2 or more but 4 or less, and more preferably 2. This makes it possible to exhibit the effects as described above conspicuously.

Substance A

Furthermore, it is preferred that the ultraviolet ray curable ink composition of the invention includes a substance A having a partial structure represented by the following formula (5).

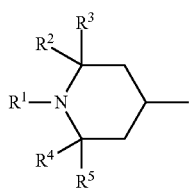

(5)

where in the formula (5), "$R^1$" is an oxygen atom, a hydrogen atom, a hydrocarbon group or an alkoxyl group, and each of "$R^2$", "$R^3$", "$R^4$" and "$R^5$" is independently a hydrogen atom or a hydrocarbon group.

In the case where the ultraviolet ray curable ink composition contains the substance A having such a chemical structure together with the metal particles subjected to the surface treatment as described above and the liquid component having the alicyclic structure including the hetero atom and further the monomer having the alicyclic structure, it is possible to make the storage stability and the curing property of the ultraviolet ray curable ink composition excellent. Further, in the printed object to be produced by using the ultraviolet ray curable ink composition, it is possible to exhibit the gloss and the high-grade sense provided inherently by the metal material constituting the metal particles of the metal powder efficiently. Consequently, it is also possible to make the gloss and the wear resistance of the printed portion superior, to thereby improve the durability of the printed object.

In the above formula (5), "$R^1$" may be the oxygen atom, the hydrogen atom, the hydrocarbon group or the alkoxyl group (in which a chain type or alicyclic type hydrocarbon group is bonded to an oxygen atom), but is especially preferably the hydrogen atom, a methyl group or an octyl oxy group. This makes it possible to especially improve the storage stability and the ejection stability of the ultraviolet ray curable ink composition, and the gloss and the wear resistance of the printed portion to be formed by using the ultraviolet ray curable ink composition.

Further, in the above formula (5), each of "$R^2$" to "$R^5$" may be independently the hydrogen atom or the hydrocarbon group, but is preferably an alkyl group having carbon atoms in the range of 1 or more but 3 or less, and more preferably a methyl group. This makes it possible to especially improve the storage stability and the ejection stability of the ultraviolet ray curable ink composition, and the gloss and the wear resistance of the printed portion to be formed by using the ultraviolet ray curable ink composition.

An amount of the substance A contained in the ultraviolet ray curable ink composition is preferably in the range of 0.1 mass % or more but 5.0 mass % or less, and more preferably in the range of 0.5 mass % or more but 3.0 mass % or less. This makes it possible to especially improve the storage stability, the ejection stability and the curing property of the ultraviolet ray curable ink composition, and the gloss, the wear resistance and the like of the printed object to be produced by using the ultraviolet ray curable ink composition. In this regard, it is to be noted that the ultraviolet ray curable ink composition may contain two or more kinds of compounds as the substance A. In this case, it is preferred that a total amount of these compounds is set to a value falling within the above range.

In the case where the amount of the substance A contained in the ultraviolet ray curable ink composition is defined as $X_A$ [mass %] and the amount of the metal particles of the metal powder contained therein is defined as $X_M$ [mass %], $X_A$ and $X_M$ satisfy preferably a relationship of $0.01 \leq X_A/X_M \leq 0.8$, and more preferably a relationship of $0.05 \leq X_A/X_M \leq 0.4$. By satisfying such a relationship, it is possible to especially improve the storage stability and the ejection stability of the ultraviolet ray curable ink composition, and to make the gloss and the wear resistance of the printed portion to be formed by using the ultraviolet ray curable ink composition especially excellent.

Dispersant

The ultraviolet ray curable ink composition of the invention may contain a metal dispersant in a powder form (hereinafter, referred to as simply "dispersant"). This makes it possible to especially improve the storage stability of the ultraviolet ray curable ink composition.

In particular, the ultraviolet ray curable ink composition of the invention may contain a compound having a polymer structure and basic property as the dispersant in the powder form (hereinafter, referred to as "basic polymer dispersant"). This ensures that the storage stability of the ultraviolet ray curable ink composition is excellent.

In this regard, it is to be noted that a specific molecular weight of the basic polymer dispersant is not limited particularly as long as the basic polymer dispersant has the basic property and the polymer structure.

The polymer structure constituting the basic polymer dispersant is not limited particularly. Examples of such a polymer structure include an acrylic-based polymer structure (including a copolymer), a methacrylic-based polymer structure (including a copolymer), a polyurethane-based polymer structure, a hydroxyl group-containing carboxylate ester structure, a polyether-based polymer structure, a silicone-based polymer structure and the like.

An amine number of the basic polymer dispersant is not limited particularly, but is preferably in the range of 3 mgKOH/g or more but 80 mgKOH/g or less, and more preferably in the range of 10 mgKOH/g or more but 70 mgKOH/g or less.

Examples of the basic polymer dispersant used in the invention include DISPERBYK-116 (produced by BYK Japan KK), DISPERBYK-182 (produced by BYK Japan KK), DISPERBYK-183 (produced by BYK Japan KK), DISPERBYK-184 (produced by BYK Japan KK), DISPERBYK-2155 (produced by BYK Japan KK), DISPERBYK-2164 (produced by BYK Japan KK), DISPERBYK-108 (produced by BYK Japan KK), DISPERBYK-112 (produced by BYK Japan KK), DISPERBYK-198 (produced by BYK Japan KK), DISPERBYK-2150 (produced by BYK Japan KK), PAA-1112 (produced by Nitto Boseki Co., Ltd.), and the like.

In the case where the ultraviolet ray curable ink composition contains the dispersant, an amount of the dispersant contained in the ultraviolet ray curable ink composition is preferably 5.0 mass % or less, and more preferably in the range of 0.01 mass % or more but 2.0 mass % or less. This makes it possible to especially improve the storage stability, the ejection stability and the curing property of the ultraviolet ray curable ink composition, and the gloss of the printed object to be produced by using the ultraviolet ray curable ink composition. In this regard, it is to be noted that the ultraviolet ray curable ink composition may contain two or more kinds of compounds as the basic polymer dispersant. In this case, it is preferred that a total amount of these compounds is set to a value falling within the above range. If the amount of the dispersant contained in the ultraviolet ray curable ink composition is too large, the ratio of the metal particles of the metal powder existing in the ultraviolet ray curable ink composition increases in the ultraviolet ray curable ink composition applied onto the recording medium by the excess improvement of the dispersibility of the metal powder, so that it is difficult to reliably arrange the metal particles of the metal powder at the vicinity of the outer surface of the applied ultraviolet ray curable ink composition. Consequently, there is a possibility that it becomes difficult to improve the gloss of the finally obtained printed object (printed portion) sufficiently.

Other Components

The ultraviolet ray curable ink composition of the invention may contain components other than the above mentioned components (that is, other components). Examples of such other components include a photopolymerization initiator, a slipping agent (leveling agent), a solvent (liquid component) other than the liquid component having the alicyclic structure including the hetero atom, a polymerization accelerator, a polymerization inhibitor, a penetration accelerator, a wetting agent (moisturizing agent), a coloring agent, a fixing agent, an antifungal agent, an antiseptic agent, an antioxidant, a chelating agent, a thickening agent, a sensitizing agent (sensitizing dye) and the like.

The photopolymerization initiator is not limited to a specific type, as long as it can generate active species such as radicals, cations and the like by being irradiated with an ultraviolet ray, and thus can start a polymerization reaction of the polymerizable compound. As the photopolymerization initiator, a photo radical polymerization initiator or a photo cation polymerization initiator can be used, but the photo radical polymerization initiator can be preferably used. In the case where the photopolymerization initiator is used, it is preferred that the photopolymerization initiator has an absorption peak within an ultraviolet region.

Examples of the photo radical polymerization initiator include aromatic ketones, an acyl phosphine oxide compound, an aromatic onium salt compound, an organic peroxide, a thiocompound (e.g., a thioxanthone compound, a thiophenyl group containing compound), a hexaaryl biimidazole compound, a ketooxime ester compound, a borate compound, an azinium compound, a metallocene compound, an activated ester compound, a compound including a carbon-halogen bond, an alkyl amine compound and the like.

From the viewpoint of solubility with respect to the polymerizable compound and a curing property thereof, among them, at least one selected from the group consisting of the acyl phosphine oxide compound and the thioxanthone compound is preferable, and a combination of the acyl phosphine oxide compound and the thioxanthone compound is more preferable.

Concrete examples of the photo radical polymerization initiator include acetophenone, acetophenone benzyl ketal, 1-hydroxy cyclohexyl phenyl ketone, 2,2-dimethoxy-2-phenyl acetophenone, xanthone, fluorenone, benzaldehyde, fluorene, anthraquinone, triphenylamine, carbazole, 3-methyl acetophenone, 4-chloro benzophenone, 4,4'-dimethoxy benzophenone, 4,4'-diamino benzophenone, Michler's ketone, benzoin propyl ether, benzoin ethyl ether, benzyl dimethyl ketal, 1-(4-isopropyl phenyl)-2-hydroxy-2-methylpropane-1-on, 2-hydroxy-2-methyl-1-phenylpropane-1-on, thioxanthone, diethyl thioxanthone, 2-isopropyl thioxanthone, 2-chloro thioxanthone, 2-methyl-1-[4-(methylthio) phenyl]-2-morpholino-propane-1-on, bis(2,4,6-trimethyl benzoyl)-phenyl phosphineoxide, 2,4,6-trimethyl benzoyl-diphenyl phosphineoxide, 2,4-diethyl thioxanthone, bis (2,6-dimethoxy benzoyl)-2,4,4-trimethyl pentyl phosphineoxide, and the like. One of them can be used alone or two or more of them can be used in combination.

An amount of the photopolymerization initiator contained in the ultraviolet ray curable ink composition is preferably in the range of 0.5 mass % or more but 10 mass % or less. If the amount of the photopolymerization initiator falls within the above range, a curing rate of the ultraviolet ray curable ink composition becomes sufficiently high, and an insoluble matter of the photopolymerization initiator or coloring resulting from the photopolymerization initiator is hardly generated.

In the case where the ultraviolet ray curable ink composition contains the slipping agent, a surface of the printed object becomes smooth due to a leveling effect thereof. This makes it possible to improve the wear resistance of the printed object.

The slipping agent is not limited to a specific kind. As the slipping agent, a silicone-based surfactant such as a polyester-modified silicone, a polyether-modified silicone or a polyacrilate-modified silicone, and a high molecular weight-based surfactant such as polyacrylate and polyester can be used, and polyether-modified polydimethyl siloxane, polyester-modified polydimethyl siloxane or polyacrylate-modified dimethyl siloxane can be preferably used.

The ultraviolet ray curable ink composition of the invention may contain the polymerization inhibitor. However, even if the ultraviolet ray curable ink composition contains the polymerization inhibitor, an amount of the polymerization inhibitor contained in the ultraviolet ray curable ink composition is preferably 0.6 mass % or less, and more preferably 0.2 mass % or less. This makes it possible to adjust the amount of the polymerizable compound contained in the ultraviolet ray curable ink composition to a relatively high value. Therefore, it is possible to especially improve the wear resistance and the like of the printed portion to be formed using the ultraviolet ray curable ink composition. Further, in the invention, even in the case where the amount of the polymerization inhibitor is relatively lower in such a way, it is possible to make the storage stability and the ejection stability of the ultraviolet ray curable ink composition sufficiently excellent.

A viscosity at room temperature (20° C.) of the ultraviolet ray curable ink composition of the invention is preferably 20 mPa·s or less, and more preferably in the range of 3 mPa·s or more but 15 mPa·s or less. This makes it possible to appropriately eject the ultraviolet ray curable ink composition using the ink jet method.

Printed Object

Next, a printed object of the invention will be described.

The printed object of the invention is produced by applying the above mentioned ultraviolet ray curable ink composition onto the recording medium, and then irradiating the ultraviolet ray curable ink composition with an ultraviolet ray. Such a printed object is provided with a pattern (printed portion) having high gloss and wear resistance.

As described above, the ultraviolet ray curable ink composition according to the invention contains the predetermined polymerizable compound, and thus exhibits excellent adhesion with respect to the recording medium. Therefore, since the ultraviolet ray curable ink composition of the invention exhibits the excellent adhesion with respect to the recording medium, the recording medium may be any types. As the recording medium, an absorbent medium or an unabsorbent medium may be used. For example, a paper (e.g., a plain paper, a special paper for ink jet), a plastic material, a metal, a ceramics, a timber, a shell, a natural or synthetic fiber such as cotton, polyester or wool, a nonwoven fabric or the like can be used.

The printed object of the invention may be used in any applications, for example, may be used in trinkets or articles other than the trinkets. Concrete examples of the printed object of the invention include: vehicular interior trims such as a console lid, a switch base, a center cluster, an interior panel, an emblem, a center console and meter nameplate; operating portions of various kinds of electronic devices (keyswitchs); trims exhibiting decorativeness; presentments such as an index and a logo; and the like.

As a system for ejecting liquid droplets (that is, a system of the ink jet method), a piezo system, a system for ejecting an ink by bubbles which are generated by heating the ink, or the like can be used. However, the piezo system is preferable, for the reason that the ultraviolet ray curable ink composition is difficult to be deteriorated, and the other reasons.

The ejection of the ultraviolet ray curable ink composition by the ink jet method can be carried out by using a well-known liquid droplet ejection device.

The ultraviolet ray curable ink composition ejected by the ink jet method is cured by being irradiated with the ultraviolet ray.

As an ultraviolet ray irradiation source, for example, a mercury lamp, a metal halide lamp, an ultraviolet ray light emitting diode (UV-LED), an ultraviolet ray laser diode (UV-LD) or the like can be used. Among them, the ultraviolet ray light emitting diode (UV-LED) or the ultraviolet ray laser diode (UV-LD) is preferable, for the reasons that such a source has a small size, a long life time, high efficiency and a low cost.

While the invention has been described hereinabove based on the preferred embodiments, the invention is not limited thereto.

EXAMPLES

Next, description will be made on concrete examples of the invention.

1. Production of Ink Jet Composition (Ultraviolet Ray Curable Ink Composition)

Example 1

First, prepared was a film having a flat surface and made of polyethylene terephthalate (surface roughness Ra: 0.02 μm or less).

Next, silicone oil was applied onto the entirety of one surface of the film.

Next, a coat made of Al was formed onto a surface of the film on which the silicone oil was applied using an evaporation method.

The film (base) made of polyethylene terephthalate, on which the Al coat was formed, was dipped into a liquid constituted of diethylene glycol diethyl ether, and then ultrasonic vibration was applied thereto. In this way, obtained was a dispersion liquid of scaly particles (that is, particles to be used as base particles) each made of Al.

Next, $CF_3(CF_2)_5(CH_2)_2O(P)(OH)_2$ as the fluorine type phosphoric acid ester was added into the dispersion liquid of the particles made of Al obtained as above so that a concentration thereof became 1 mass % to obtain a mixture. The mixture was stirred at a temperature of 45° C. for 120 minutes to subject a surface treatment with a fluorine type phosphoric acid ester, thereby obtaining a metal powder dispersion liquid. The metal powder dispersion liquid was filtered and dried to obtain metal powder.

Thus obtained metal particles of the metal powder had an average particle size of 0.8 μm and an average thickness of 60 nm (because each particle was formed in scaly shape).

Next, the metal powder was mixed with γ-butyrolactone as a liquid component having an alicyclic structure including a hetero atom, γ-butyrolactone acrylate as a monomer having an alicyclic structure (polymerizable compound), phenoxy ethyl acrylate as the monomer having no alicyclic structure (polymerizable compound), Irgacure 819 (produced by BASF Japan Ltd.) as a photopolymerization initiator, Speedcure TPO (produced by ACETO) as a photopolymerization initiator, Speedcure DETX (produced by Lambson Limited) as a photopolymerization initiator, and a substance A having a chemical structure represented by the following formula (6). By doing so, obtained was an ink jet composition (ultraviolet ray curable ink composition).

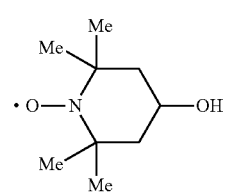

(6)

Examples 2 to 19

In each of the Examples 2 to 19, an ink jet composition (ultraviolet ray curable ink composition) was produced in the same manner as the Example 1, except that a constitution (composition of each base particle and a kind of compound used for the surface treatment (fluorine type compound)) of the metal particles was changed as shown in Tables 1 and 2, and the kinds and ratio of the raw materials used for preparing the ink jet composition (ultraviolet ray curable ink composition) were changed as shown in Tables 1 and 2.

Comparative Example 1

An ink jet composition (ultraviolet ray curable ink composition) was produced in the same manner as Example 1, except that particles each made of Al and not subjected to the surface treatment were used as the metal particles of the metal powder.

Comparative Example 2

An ink jet composition (ultraviolet ray curable ink composition) was produced in the same manner as Example 1, except that spherical Al particles produced by using a gas atomizing method (not subjected to the surface treatment) were used as the metal particles of the metal powder.

Comparative Example 3

An ink jet composition (ultraviolet ray curable ink composition) was produced in the same manner as Example 1, except that $NH_3-(CH_2)_3-Si(OCH_3)_3$, which was not the fluorine type silane compound and the fluorine phosphoric acid ester, was used instead of $CF_3(CF_2)_5(CH_2)_2O(P)(OH)_2$ as the fluorine phosphoric acid ester, and subjected to the surface treatment to obtain the metal particles of the metal powder.

Comparative Example 4

An ink jet composition (ultraviolet ray curable ink composition) was produced in the same manner as Example 1, except that the amount of the liquid component having the alicyclic structure including the hetero atom became 0.04 mass %, and the kinds and ratio of the raw materials used for preparing the ink jet composition (ultraviolet ray curable ink composition) were changed as shown in Table 2.

Comparative Example 5

An ink jet composition (ultraviolet ray curable ink composition) was produced in the same manner as Example 1, except that the amount of the liquid component having the alicyclic structure including the hetero atom became 7.1 mass %, and the kinds and ratio of the raw materials used for preparing the ink jet composition (ultraviolet ray curable ink composition) were changed as shown in Table 2.

Comparative Examples 6 to 9

In each of the Comparative Examples 6 to 9, an ink jet composition (ultraviolet ray curable ink composition) was produced in the same manner as Example 1, except that the liquid component having the alicyclic structure including the hetero atom was not used, and the kinds and ratio of the raw materials used for preparing the ink jet composition (ultraviolet ray curable ink composition) were changed as shown in Table 2.

The constitutions of the ink jet compositions obtained in the Examples and the Comparative Examples were shown in Table 1 and Table 2 as a whole. In each of Tables, the amount and the kind of the liquid component having the alicyclic structure including the hetero atom in each of the Examples and the Comparative Examples 1 to 5 were indicated in the column "Liquid component". Further, the amount and the kind of the liquid component having no alicyclic structure in the Comparative Example 8 were indicated in the column "Liquid component". Furthermore, the amount and the kind of the liquid component having the alicyclic structure including no hetero atom in the Comparative Example 9 were indicated in the column "Liquid component". Further, in Tables, indicated were $CF_3(CF_2)_5(CH_2)_2O(P)(OH)_2$ as "S1", $CF_3(CF_2)_5(CH_2)_2O(P)(OH)(OCH_2CH_3)$ as "S2", $CF_3(CF_2)_4(CH_2)_2O-PO(OH)_2$ as "S3", $CF_3(CF_2)_5-CH_2CH_2-Si(OC_2H_5)_3$ as "S4", $CF_3-CH_2CH_2-Si(OCH_3)_3$ as "S5", $CF_3(CF_2)_7-CH_2CH_2-Si(OCH_3)_3$ as "S6", $CF_3(CF_2)_5(CH_2)_2O-PO(OH)(OC_2H_5)$ as "S7", $CF_3(CF_2)_5-CH_2CH_2-Si(OCH_3)_3$ as "S8", $NH_3-(CH_2)_3-Si(OCH_3)_3-Si(OCH_3)_3$ as "S'1", γ-butyrolactone as the liquid component having the alicyclic structure including the hetero atom as "BL", N-methyl-2-pyrolidone as the liquid component having the alicyclic structure including the hetero atom as "NMP", 2-imidasolidinone as the liquid component having the alicyclic structure including the hetero atom as "IZ", 1,3-dioxane-2-on as the liquid component having the alicyclic structure including the hetero atom as "TMC", 2-oxazolidinone as the liquid component having the alicyclic structure including the hetero atom as "OZ", tetrahydrofuran as the liquid component having the alicyclic structure including the hetero atom as "THF", benzene as the liquid component having no alicyclic structure as "BZ", cyclohexanone as the liquid component having the alicyclic structure including no peter atom as "cH", γ-butyrolactone acrylate as the monomer having the alicyclic structure (polymerizable compound) as "BLA", tetrahydrofurfuryl acrylate as the monomer having the alicyclic structure (polymerizable compound) as "THFA", N-vinyl caprolactam as the monomer having the alicyclic structure (polymerizable compound) as "VC", N-vinyl pyrolidone as the monomer having the alicyclic structure (polymerizable compound) as "VP", acryloyl morpholine as the monomer having the alicyclic structure (polymerizable compound) as "AMO", tris(2-acryloyloxy ethyl) isocyanurate as the monomer having the alicyclic structure (polymerizable compound) as "TAOEI", dicyclopentenyl oxyethyl acrylate as the monomer having the alicyclic structure (polymerizable compound) as "DCPTeOEA", adamantyl acrylate as the monomer having the alicyclic structure (polymerizable compound) as "AA", dimethylol tricyclodecane diacrylate as the monomer having the alicyclic structure (polymerizable compound) as "DMTCDDA", dimethylol dicyclopentane diacrylate as the monomer having the alicyclic structure (polymerizable compound) as "DMDCPTA", dicyclopentenyl acrylate as the monomer having the alicyclic structure (polymerizable compound) as "DCPTeA", dicyclopentanyl acrylate as the monomer having the alicyclic structure (polymerizable compound) as "DCPTaA", isobornyl acrylate as the monomer having the alicyclic structure (polymerizable compound) as "IBA", cyclohexyl acrylate as the monomer having the alicyclic structure (polymerizable compound) as "CHA", diacrylated isocyanurate as the monomer having the alicyclic structure (polymerizable compound) as "DAI", triacrylated isocyanurate as the monomer having the alicyclic structure (polymerizable compound) as "TAI", γ-butyrolactone methacrylate as the monomer having the alicyclic structure (polymerizable compound) as "BLM", tetrahydrofurfuryl methacrylate as the monomer having the alicyclic structure (polymerizable compound) as "THFM", dicyclopentenyl oxyethyl methacrylate as the monomer having the alicyclic structure (polymerizable compound) as "DCPTeOEM", adamantyl methaacrylate as the monomer having the alicyclic structure (polymerizable compound) as "AM", pentamethyl piperidyl methacrylate as the monomer having the alicyclic structure (polymerizable compound) as "PMPM", tetramethyl piperidyl methacrylate as the monomer having the alicyclic structure (polymerizable compound) as "TMPM", 2-methyl-2-adamantyl methacrylate as the monomer having the alicyclic structure (polymerizable compound) as "MAM", 2-ethyl-2-adamantyl methacrylate as the monomer having the alicyclic structure (polymerizable compound) as "EAM", mevalonic acid lactone methacrylate as the monomer having the alicyclic structure (polymerizable compound) as "MLM", dicyclopentenyl methacrylate as the monomer having the alicyclic structure (polymerizable compound) as "DCPTeM", dicyclopentanyl methacrylate as the monomer having the alicyclic structure (polymerizable compound) as "DCPTaM", isobornyl methacrylate as the monomer having the alicyclic structure (polymerizable compound) as "IBM", cyclohexyl methacrylate as the monomer having the alicyclic structure (polymerizable compound) as "CHM", phenoxy ethyl acrylate as the monomer having no alicyclic structure (polymerizable compound) as "PEA", dipropylene glycol diacrylate as the monomer having no alicyclic structure (polymerizable compound) as "DPGDA", tripropylene glycol diacrylate as the monomer having no alicyclic structure (polymerizable compound) as "TPGDA", 2-hydroxy-3-phenoxy propyl acrylate as the monomer having no alicyclic structure (polymerizable compound) as "HPPA", 4-hydroxy butyl acrylate as the monomer having no alicyclic structure (polymerizable compound) as "HBA", ethyl carbitol acrylate as the monomer having no alicyclic structure (polymerizable compound) as "ECA", methoxy triethylene glycol acrylate as the monomer having no alicyclic structure (polymerizable compound) as "MTEGA", t-butyl acrylate as the monomer having no alicyclic structure (polymerizable compound) as "TBA", benzyl acrylate as the monomer having no alicyclic structure (polymerizable compound) as "BA", 2-(2-hydroxy ethoxy) ethyl acrylate as the monomer having no alicyclic structure (polymerizable compound) as "VEER", benzyl methacrylate as the monomer having no alicyclic structure (polymerizable compound) as "BM", urethane acrylate as the monomer having no alicyclic structure (polymerizable compound) as "UA", DISPERBYK-182 (produced by BYK Japan KK, an amine number is 13 mgKOH/g) as "D2", DISPERBYK-2155 (produced by BYK Japan KK, an amine number is mgKOH/g) as "D5", a compound represented by the above formula (6) (that is, the substance A) as "A1", a compound represented by the following formula (7) (that is, the substance A) as "A2", a compound represented by the following formula (8) (that is, the substance A) as "A3", a compound represented by the following formula (9) (that is, the substance A) as "A4", Irgacure 819 (produced by BASF Japan Ltd.) as "ic819", Speedcure TPO (produced by ACETO) as "scTPO", Speedcure DETX (produced by Lambson Limited) as "scDETX", UV-3500 (produced by BYK Japan KK) as "UV3500", hydroquinone monomethyl ether as "MEHQ", LHP-96 (produced by kusumoto Chemicals, Ltd.) as "LHP", and LF-1984 (produced by kusumoto Chemicals, Ltd.) as "LF". Furthermore, in the composition of the constituent material of the base particles in the Example 15 of Table 2, an amount of each element was shown in a ratio by weight. Furthermore, arbitrary 10 particles contained in each ink jet composition were observed. In each of the particles, an area of the particle observed from a direction where a project area thereof becomes maximum (that is, an area of each particle at a planar view thereof) is defined as $S_1$ ($\mu m^2$) and an area of the particle observed from a direction where the area of the particle observed from directions orthogonal to the above observation direction becomes maximum is defined as $S_0$ ($\mu m^2$), and a ratio of $S_1$ to $S_0$ ($S_1/S_0$) was calculated to obtain 10 values. An average of the calculated 10 values was indicated in Table 1 and Table 2 as a whole. Moreover, a viscosity at 20° C. of the ink jet composition (ultraviolet ray curable ink composition) obtained in each of the Examples, which was measured by using an oscillating type viscometer based on JIS Z8809, was a value falling within the range of 3 mPa·s or more but 15 mPa·s or less. In this regard, it is to be noted that each of D2 and D5 had the basic property and the polymer structure (basic polymer dispersant).

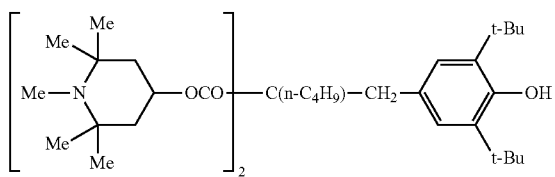

(7)

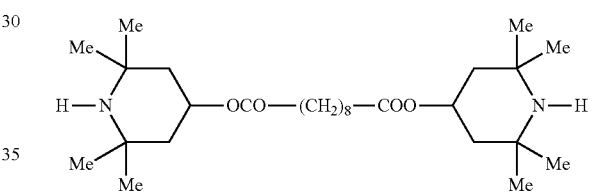

(8)

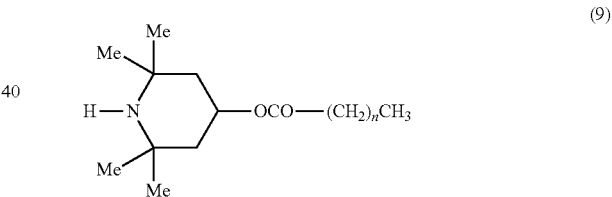

(9)

where the substance A represented by the formula (9) is a mixture of a plurality of compounds in which "n" in the formula is 10 or more but 19 or less (main components are compounds in which "n" in the formula is 15 or more but 18 or less).

TABLE 1

| | Constitution of metal powder | | Constitution of ink jet composition | | | | | |
|---|---|---|---|---|---|---|---|---|
| | Constituent | | Metal particles of metal powder | | | | | |
| | material of base particles | Material used for surface treatment | Shape | Average particle size [μm] | $S_1/S_0$ | Amount [mass %] | Liquid component Kind | Amount [mass %] | Polymerizable compound Kind |
| Ex. 1 | A1 | S1 | Scaly | 0.8 | 23 | 2.0 | BL | 0.06 | BLA/PEA |
| Ex. 2 | A1 | S2 | Scaly | 0.9 | 25 | 4.0 | BL | 1.2 | BLA/THFA |
| Ex. 3 | A1 | S1 + S2 | Scaly | 2.0 | 51 | 2.0 | BL/ NMP | 1.8/ 1.8 | VC/VP/ AMO/VEEA |

TABLE 1-continued

| | | | | | | | | | |
|---|---|---|---|---|---|---|---|---|---|
| Ex. 4 | A1 | S3 | Scaly | 1.0 | 29 | 2.0 | BL | 1.0 | BLM/THFM/TAOEI/DCPTeOEA/AA/PEA/DPGDA |
| Ex. 5 | A1 | S5 | Scaly | 0.9 | 24 | 2.0 | NMP | 5.5 | AM/PMPM/TMPM/MAM/EAM/DCPTeA/PEA/TPGDA/VEEA |
| Ex. 6 | A1 | S7 | Scaly | 0.8 | 23 | 2.0 | NMP | 1.5 | DCPTeOEM/MLM/DMTCDDA/DCPTaA/IBA/CHM/PEA/HPPA |
| Ex. 7 | A1 | S1 | Scaly | 0.8 | 23 | 2.0 | NMP | 2.0 | DMDCPTA/DCPTeM/DCPTaM/IBM/CHA/PEA/HBA/VEEA |
| Ex. 8 | A1 | S1 + S2 | Scaly | 0.9 | 25 | 4.0 | BL | 2.5 | BLA/THFA/PEA/HBA/AMO |
| Ex. 9 | A1 | S2 | Scaly | 2.0 | 51 | 2.0 | NMP | 3.0 | BLA/THFA/VC/PEA |
| Ex. 10 | A1 | S4 | Scaly | 1.1 | 28 | 2.0 | TMC | 0.8 | BLA/THFA/TBA/VEEA/UA |
| Ex. 11 | A1 | S5 | Scaly | 1.0 | 29 | 2.0 | BL | 4.0 | BLA/THFA/VP/PEA |
| Ex. 12 | A1 | S6 | Scaly | 0.7 | 19 | 4.0 | OZ | 0.7 | BLA/THFA/VEEA/BM/UA |
| Ex. 13 | A1 | S7 | Scaly | 0.9 | 25 | 2.0 | NMP | 4.5 | BLA/THFA/PEA |

| | Constitution of ink jet composition | | | | | | |
|---|---|---|---|---|---|---|---|
| | Polymerizable compound | Dispersant | | Substance A | | Other components | |
| | Amount [mass %] | Kind | Amount [mass %] | Kind | Amount [mass %] | Kind | Amount [mass %] |
| Ex. 1 | 60.0/27.74 | — | — | A1 | 0.2 | ic819/scTPO/scDETX | 4.0/4.0/2.0 |
| Ex. 2 | 41.5/42.1 | — | — | A2 | 0.8 | ic819/scTPO/scDETX/UV3500/MEHQ | 4.0/4.0/2.0/0.2/0.2 |
| Ex. 3 | 25.8/32.1/17.5/6.0 | D2 | 1.4 | A1 | 1.4 | ic819/scTPO/scDETX/UV3500 | 4.0/4.0/2.0/0.2 |
| Ex. 4 | 7.4/5.1/31.0/32.0/5.5/4.0/2.9 | — | — | A3 | 0.7 | ic819/scTPO/UV3500/MEHQ | 4.0/4.0/0.2/0.2 |
| Ex. 5 | 3.9/7.9/3.0/3.0/3.1/55.1/1.7/1.2/2.0 | — | — | A4 | 1.2 | ic819/scTPO/scDETX/UV3500/MEHQ | 4.0/4.0/2.0/0.2/0.2 |
| Ex. 6 | 3.8/3.6/19.6/29.1/9.6/9.4/6.5/3.5 | — | — | A1 | 1.0 | ic819/scTPO/scDETX/UV3500/MEHQ | 4.0/4.0/2.0/0.2/0.2 |
| Ex. 7 | 45.42/5.5/6.6/5.9/17.8/2.1/1.1/1.0 | — | — | A1 | 0.58 | ic819/scTPO/scDETX | 4.0/4.0/2.0 |
| Ex. 8 | 29.1/34.0/9.5/6.5/3.2 | — | — | A2 | 0.8 | ic819/scTPO/scDETX/UV3500/MEHQ | 4.0/4.0/2.0/0.2/0.2 |
| Ex. 9 | 25.2/32.7/7.2/16.9 | D2 | 1.4 | A1 | 1.4 | ic819/scTPO/scDETX/LF | 4.0/4.0/2.0/0.2 |
| Ex. 10 | 26.6/23.5/15.0/9.5/11.8 | — | — | A1 | 0.4 | ic819/scTPO/scDETX/UV3500/MEHQ | 4.0/4.0/2.0/0.2/0.2 |
| Ex. 11 | 33.5/34.9/3.5/12.9 | — | — | A3 | 0.8 | ic819/scTPO/UV3500/MEHQ | 4.0/4.0/0.2/0.2 |
| Ex. 12 | 24.9/23.9/14.1/16.1/9.5 | D5 | 0.2 | A1 | 0.2 | ic819/scTPO/UV3500/MEHQ | 4.0/2.0/0.2/0.2 |
| Ex. 13 | 32.0/34.1/15.8 | — | — | A4 | 1.2 | ic819/scTPO/scDETX/UV3500/MEHQ | 4.0/4.0/2.0/0.2/0.2 |

TABLE 2

| | Constitution of metal powder | | Constitution of ink jet composition | | | | | | | |
|---|---|---|---|---|---|---|---|---|---|---|
| | Constituent material of base particles | Material used for surface treatment | Metal particles of metal powder | | | Liquid component | | Polymerizable compound Kind | Polymerizable compound Amount [mass %] | Dispersant Kind |
| | | | Shape | Average particle size [μm] | $S_1/S_0$ | Amount [mass %] | Kind | Amount [mass %] | | |
| Ex. 14 | Al | S8 | Scaly | 1.5 | 39 | 1.0 | THF | 0.3 | DAI/TAI/ECA/MTEGA/IBA/BA | 20.8/20.0/18.1/17.2/6.0/5.2 | — |
| Ex. 15 | Ni49.5 Fe50.5 | S6 | Scaly | 1.8 | 47 | 2.0 | BL | 6.5 | BLA/THFA/TBA/VEEA/UA | 27.0/26.5/13.8/9.5/3.5 | — |
| Ex. 16 | SUS316L | S7 | Scaly | 1.5 | 39 | 2.0 | BL | 6.2 | BLA/THFA/VEEA/BM/UA | 26.2/27.6/14.1/9.5/3.8 | D5 |
| Ex. 17 | Al | S3 + S4 | Scaly | 0.8 | 23 | 2.0 | BL | 5.0 | BLA/THFA/PEA | 30.8/34.1/15.7 | D2 |
| Ex. 18 | Al | S1 | Scaly | 0.9 | 25 | 1.5 | BL | 3.6 | AMO/THFA | 40.1/43.3 | — |
| Ex. 19 | Al | S2 | Scaly | 0.9 | 25 | 1.2 | NMP | 3.6 | AMO/THFA/PEA | 36.4/40.0/7.0 | — |
| Com. Ex. 1 | Al | — | Scaly | 0.8 | 23 | 2.0 | BL | 3.6 | BLA/PEA | 60.0/24.2 | — |
| Com. Ex. 2 | Al | — | Spherical | 0.8 | 1 | 2.0 | BL | 3.6 | BLA/PEA | 60.0/24.2 | — |
| Com. Ex. 3 | Al | S'1 | Scaly | 0.8 | 23 | 2.0 | BL | 3.6 | BLA/PEA | 60.0/24.2 | — |
| Com. Ex. 4 | Al | S1 | Scaly | 0.8 | 23 | 2.0 | BL | 0.04 | BLA | 87.76 | — |
| Com. Ex. 5 | Al | S1 | Scaly | 0.8 | 23 | 2.0 | BL | 7.1 | BLA | 80.7 | — |
| Com. Ex. 6 | Al | S1 | Scaly | 0.8 | 23 | 2.0 | — | — | BLA | 87.8 | — |
| Com. Ex. 7 | Al | S1 | Scaly | 0.8 | 23 | 2.0 | — | — | BLA | 81.8 | D2 |
| Com. Ex. 8 | Al | S1 | Scaly | 0.8 | 23 | 2.0 | BZ | 3.6 | BLA/PEA | 60.0/24.2 | — |
| Com. Ex. 9 | Al | S1 | Scaly | 0.8 | 23 | 2.0 | cH | 3.6 | BLA/PEA | 60.0/24.2 | — |

| | Dispersant Amount [mass %] | Substance A Kind | Substance A Amount [mass %] | Other components Kind | Other components Amount [mass %] |
|---|---|---|---|---|---|
| Ex. 14 | — | A1 | 1.0 | ic819/scTPO/scDETX/UV3500/MEHQ | 4.0/4.0/2.0/0.2/0.2 |
| Ex. 15 | — | A2 | 0.8 | ic819/scTPO/scDETX/UV3500/MEHQ | 4.0/4.0/2.0/0.2/0.2 |
| Ex. 16 | 0.2 | A1 | 0.2 | ic819/scTPO/scDETX/LHP | 4.0/4.0/2.0/0.2 |
| Ex. 17 | 1.0 | A1 | 1.0 | ic819/scTPO/scDETX/UV3500/MEHQ | 4.0/4.0/2.0/0.2/0.2 |
| Ex. 18 | — | A2 | 0.3 | ic819/scTPO/scDETX/LHP/LF | 4.0/4.0/2.0/0.2/0.2 |
| Ex. 19 | — | A2 | 0.6 | ic819/scTPO/scDETX/MEHQ | 4.0/4.0/2.0/0.4 |
| Com. Ex. 1 | — | A1 | 0.2 | ic819/scTPO/scDETX | 4.0/4.0/2.0 |
| Com. Ex. 2 | — | A1 | 0.2 | ic819/scTPO/scDETX | 4.0/4.0/2.0 |
| Com. Ex. 3 | — | A1 | 0.2 | ic819/scTPO/scDETX | 4.0/4.0/2.0 |
| Com. Ex. 4 | — | A1 | 0.2 | ic819/scTPO/scDETX | 4.0/4.0/2.0 |
| Com. Ex. 5 | — | A1 | 0.2 | ic819/scTPO/scDETX | 4.0/4.0/2.0 |
| Com. Ex. 6 | — | A1 | 0.2 | ic819/scTPO/scDETX | 4.0/4.0/2.0 |
| Com. Ex. 7 | 6.0 | A1 | 0.2 | ic819/scTPO/scDETX | 4.0/4.0/2.0 |
| Com. Ex. 8 | — | A1 | 0.2 | ic819/scTPO/scDETX | 4.0/4.0/2.0 |
| Com. Ex. 9 | — | A1 | 0.2 | ic819/scTPO/scDETX | 4.0/4.0/2.0 |

2. Evaluation of Stability of Liquid Droplet Ejection (Ejection Stability Evaluation)

The ink jet composition prepared in each of the Examples and the Comparative Examples was evaluated by tests as described below.

First, a liquid droplet ejection device provided inside a chamber (thermal chamber) and the ink jet composition obtained in each of the Examples and the Comparative Examples were prepared. Driving waveforms of piezo elements were optimized, and then 2,000,000 liquid droplets of the ink jet composition were continuously ejected from the respective nozzles of the liquid droplet ejection head under the environment of 25° C. and 55% RH. Thereafter, operation of the liquid droplet ejection device was stopped, and then was left for 360 hours under the environment of 25° C. and 55% RH in a state that the ink jet composition was filled into flow passes of the liquid droplet ejection device.

Next, 4,000,000 liquid droplets of the ink jet composition were continuously ejected from the respective nozzles of the ink jet head under the environment of 25° C. and 55% RH. On each of 4,000,000 liquid droplets ejected from the specified nozzles located at the vicinity of a central portion of the liquid droplet ejection head after a lapse of 3600 hours, a shift length "d" between a center point of the spotted (landed) droplet and an objective point thereof to be spotted was measured. An average value of the shift lengths "d" was calculated. Based on the calculated average value, the stability of liquid droplet ejection was evaluated according to the following criteria including 5 grades. In this regard, it is to be noted that a smaller average value means that change of an ejecting direction of each liquid droplet is effectively prevented.

A: The average value of the shift lengths "d" is less than 0.07 μm.

B: The average value of the shift lengths "d" is 0.07 μm or more, but less than 0.14 μm.

C: The average value of the shift lengths "d" is 0.14 μm or more, but less than 0.17 μm.

D: The average value of the shift lengths "d" is 0.17 μm or more, but less than 0.21 μm.

E: The average value of the shift lengths "d" is 0.21 μm or more.

3. Frequency Characteristic of Ink Jet Composition

A liquid droplet ejection device provided inside a chamber (thermal chamber) and the ink jet composition obtained in each of the Examples and the Comparative Examples were prepared. Driving waveforms of piezo elements were optimized, and then the liquid droplets of the ink jet composition were ejected from all of the nozzles of the liquid droplet ejection head under the environment of 25° C. and 55% RH while changing a number of vibration (frequency) of the piezo elements. The time for ejecting the liquid droplets in each frequency was set to 20 minutes. At the time of completing the ejection for 20 minutes, frequencies in which a number of nozzles, which have not been ejected, was less than 1% with respect to all of the nozzles were set as a practicable maximum frequency. Thereafter, practicable frequencies were evaluated according to the following criteria including 4 grades in a frequency range. In this regard, it is to be noted that a larger value means that the frequency characteristic of each liquid droplet is excellent.

A: The frequency is 15 kHz or more.

B: The frequency is 10 kHz or more, but less than 15 kHz.

C: The frequency is 5 kHz or more, but less than 10 kHz.

D: The frequency is less than 5 kHz.

4. Evaluation of Storage Stability of Ink Jet Composition (Long-Term Stability Evaluation)

4.1. Dispersibility

The ink jet composition obtained in each of the Examples and the Comparative Examples was left for 60 days under the environment of 40° C. Then, the ink jet composition of 1 L was passed through a capsule filter having filtration accuracy of 3 μm (produced by YAMASHIN-FILTER DORP.). At this time, concentrations of the ink in the ink jet composition were measured before and after the pass. Then, the loss of the ink jet composition by filtering coarse particles due to dispersion deficiency is obtained as a decreasing ratio of the concentration of the ink. Thereafter, the storage stability was evaluated according to the following criteria including 4 grades.

A: The decreasing ratio of the concentration of the ink is less than 5%.

B: The decreasing ratio of the concentration of the ink is 5% or more, but less than 10%.

C: The decreasing ratio of the concentration of the ink is 10% or more, but less than 20%.

D: The decreasing ratio of the concentration of the ink is 20% or more, but less than 40%.

4.2 Increasing Ratio of Viscosity

The ink jet composition prepared in each of the Examples and the Comparative Examples was left for 60 days under the environment of 40° C. Thereafter, the viscosity at 20° C. of the ink jet composition obtained in each of the Examples and the Comparative Examples was measured using an oscillating type viscometer based on JIS Z8809, and then an increasing ratio with respect to the viscosity of the ink jet composition just after prepared was calculated. Based on the increasing ratio of the viscosity, the storage stability was evaluated according to the following criteria including 5 grades.

A: The increasing ratio of the viscosity is less than 5%.

B: The increasing ratio of the viscosity is 5% or more, but less than 10%.

C: The increasing ratio of the viscosity is 10% or more, but less than 18%.

D: The increasing ratio of the viscosity is 18% or more, but less than 23%.

E: The increasing ratio of the viscosity is 23% or more, or generation of foreign materials is observed.

5. Curing Property

The ink jet composition prepared in each of the Examples and the Comparative Examples was loaded to an ink jet printer ("PM800C" produced by Seiko Epson Corporation), solid printing of the ink jet composition onto a recording medium having a thickness of 38 μm ("DIAFOIL G440E" produced by Mitsubishi Plastics Inc.) was carried out in an ink amount of 9 g/m$^2$ in wet, and then the ink jet composition was immediately irradiated with an ultraviolet ray (gap: 6 mm, peak wavelength: 365 nm, 1000 mW/cm$^2$) using a LED-UV lump ("RX firefly" produced by Phoseon Technology Inc.). Thereafter, it was confirmed whether or not the ink jet composition was cured. Based on the confirmation result, the curing property was evaluated according to the following criteria including 5 grades. The curing or non-curing of the ink jet composition was judged by rubbing a surface of the ink jet composition with a swab and observing whether or not a non-cured matter of the ink jet composition adhered to the swab. In this regard, it is to be noted that an ultraviolet ray irradiation amount in the followings A to E can be calculated by the number of seconds when the LED-UV lump was lighted.

A: The ink jet composition was cured by the ultraviolet ray irradiation amount less than 100 mJ/cm$^2$.

B: The ink jet composition was cured by the ultraviolet ray irradiation amount of 100 mJ/cm$^2$ or more, but less than 200 mJ/cm$^2$.

C: The ink jet composition was cured by the ultraviolet ray irradiation amount of 200 mJ/cm$^2$ or more, but less than 500 mJ/cm$^2$.

D: The ink jet composition was cured by the ultraviolet ray irradiation amount of 500 mJ/cm$^2$ or more, but less than 1,000 mJ/cm$^2$.

E: The ink jet composition was cured by the ultraviolet ray irradiation amount of 1,000 mJ/cm$^2$ or more, or was never cured.

6. Production of Printed Object

An interior panel as a printed object was produced by using the ink jet composition prepared in each of the Examples and the Comparative Examples as follows.

First, the ink jet composition was loaded to an ink jet device.

Next, on a base material (recording medium) having a curved surface portion, which was formed using a polycarbonate sheet with a thickness of 2 mm ("CARBOGLASS polish" produced by ASAHI GLASS CO., LTD.), the ink jet composition was ejected in a predetermined pattern.

Thereafter, the ink jet composition was heated at 60° C. for 5 minutes. Then, the ink jet composition was irradiated with an ultraviolet ray having a spectrum with maximum values at wavelengths of 365 nm, 380 nm and 395 nm and an irradiation intensity of 160 mW/cm$^2$ for 10 seconds, and thus was cured. In this way, the interior panel was produced as the printed object.

In each of the Examples and the Comparative Examples, 10 interior panels (printed objects) were produced using the ink jet composition according to the above mentioned method.

Further, 10 interior panels (printed objects) were produced by using the ink jet composition prepared in each of the Examples and the Comparative Examples in the same method as described above, except that a base material formed by using a polyethylene terephthalate sheet with a thickness of 38 μm ("DIAFOIL G440E" produced by Mitsubishi Plastics Inc.), a base material formed by using a low density polyethylene sheet ("T.U.X (L-LDPE) HC-E #80" produced by Mitsui Chemicals Tohcello Inc.), a base material formed by using a biaxial stretching polypropylene sheet ("OP U-1 #60" produced by Mitsui Chemicals Tohcello Inc.), and a base material formed by using a hard vinyl chloride sheet having a thickness of 0.5 mm ("SUNDAY SHEET (transparent)" produced by ACRYSUNDAY Co., Ltd.) were used.

7. Evaluation of Printed Object

Each of the printed objects produced in the above mentioned way was evaluated as follows.

7.1 Evaluation of Appearance of Printed Object

The printed objects produced by using the ink jet composition prepared in each of the Examples and the Comparative Examples were visually observed, and appearance of each of the printed objects was evaluated according to the following criteria including 7 grades.

A: The printed object exhibits gloss with very high-grade sense, and has extra excellent appearance.

B: The printed object exhibits gloss with very high-grade sense, and has very excellent appearance.

C: The printed object exhibits gloss with high-grade sense, and has excellent appearance.

D: The printed object exhibits gloss with high-grade sense, and has appropriate appearance.

E: The printed object exhibits inferior gloss, and has slightly poor appearance.

F: The printed object exhibits inferior gloss, and has poor appearance.

G: The printed object exhibits inferior gloss, and has extra poor appearance.

7.2 Glossiness

Glossiness of pattern formation portion of the printed object produced by using the ink jet composition prepared in each of the Examples and the Comparative Examples was measured at a measurement angle of 60° using a gloss meter ("MINOLTA MULTI GLOSS 268"), and the glossiness was evaluated according to the following criteria including 4 grades.

A: The glossiness is 400 or more.

B: The glossiness is 300 or more, but less than 400.

C: The glossiness is 200 or more, but less than 300.

D: The glossiness is less than 200.

7.3 Wear Resistance

At 48 hours having passed since the production of the printed object produced by using the ink jet composition prepared in each of the Examples and the Comparative Examples, the printed object was subjected to a wear resistance test using a Sutherland Rub Tester based on JIS K5701. Such a wear resistance test was carried out by using a film made of polyethylene terephthalate ("DIAFOIL G440E" produced by Mitsubishi Plastics Inc.) as an interleaving paper. Thereafter, on the printed objects after the wear resistance test, glossiness thereof was also measured at the measurement angle of 60° in the same manner as described in the above [7.2]. A decreasing ratio of the glossiness before and after the wear resistance test was calculated, and then the wear resistance was evaluated according to the following criteria including 5 grades.

A: The decreasing ratio of the glossiness is less than 5%.

B: The decreasing ratio of the glossiness is 5% or more, but less than 13%.

C: The decreasing ratio of the glossiness is 13% or more, but less than 23%.

D: The decreasing ratio of the glossiness is 23 or more, but less than 27%.

E: The decreasing ratio of the glossiness is 27% or more, or the particles are removed, so that the surface of the recording medium is exposed.

These results are indicated in Table 3. In this regard, in Table 3, it is to be noted that indicated are the printed object formed by using the base material made of polycarbonate as "M1", the printed object formed by using the base material made of polyethylene terephthalate as "M2", the printed object formed by using the base material made of low density polyethylene as "M3", the printed object formed by using the base material made of biaxial stretching polypropylene as "M4", and the printed object formed by using the base material made of hard vinyl chloride as "M5".

TABLE 3

| | Ejection stability | Frequency characteristic | Long-term stability Dispareibility | Viscosity | Curing property | Appearance of printed object M1 | M2 | M3 | M4 | M5 | Glossiness M1 | M2 | M3 | M4 | M5 | Wear resistance M1 | M2 | M3 | M4 | M5 |
|---|---|---|---|---|---|---|---|---|---|---|---|---|---|---|---|---|---|---|---|---|
| Ex. 1 | A | A | A | A | A | A | A | A | A | A | A | A | A | A | A | A | A | A | A | A |
| Ex. 2 | A | A | A | A | A | A | A | A | A | A | A | A | A | A | A | A | A | A | A | A |
| Ex. 3 | A | A | A | A | A | A | A | A | A | A | A | A | A | A | A | A | A | A | A | A |
| Ex. 4 | A | A | A | A | A | A | A | A | A | A | A | A | A | A | A | A | A | A | A | A |
| Ex. 5 | A | A | A | A | A | A | A | A | A | A | A | A | A | A | A | A | A | A | A | A |
| Ex. 6 | A | A | A | A | A | A | A | A | A | A | A | A | A | A | A | A | A | A | A | A |
| Ex. 7 | A | A | A | A | A | A | A | A | A | A | A | A | A | A | A | A | A | A | A | A |
| Ex. 8 | A | A | A | A | A | A | A | A | A | A | A | A | A | A | A | A | A | A | A | A |
| Ex. 9 | A | A | A | A | A | A | A | A | A | A | A | A | A | A | A | A | A | A | A | A |
| Ex. 10 | B | A | B | B | A | A | A | A | A | A | B | B | B | B | B | A | A | A | A | A |
| Ex. 11 | A | A | A | A | A | A | A | A | A | A | A | A | A | A | A | A | A | A | A | A |
| Ex. 12 | B | A | B | B | A | A | A | A | A | A | B | B | B | B | A | A | A | A | A | A |
| Ex. 13 | A | A | A | A | A | A | A | A | A | A | A | A | A | A | A | A | A | A | A | A |
| Ex. 14 | B | A | B | B | A | A | A | A | A | A | B | B | B | B | B | B | B | B | B | B |
| Ex. 15 | B | B | A | A | A | A | A | A | A | A | B | B | B | B | B | A | A | A | A | A |
| Ex. 16 | B | B | A | A | A | A | A | A | A | A | B | B | B | B | B | A | A | A | A | A |
| Ex. 17 | A | A | A | A | A | A | A | A | A | A | A | A | A | A | A | A | A | A | A | A |
| Ex. 18 | A | A | A | A | A | A | A | A | A | A | A | A | A | A | A | A | A | A | A | A |
| Ex. 19 | A | A | A | A | A | A | A | A | A | A | A | A | A | A | A | A | A | A | A | A |
| Com. Ex. 1 | E | D | D | E | A | F | F | F | F | F | C | C | C | C | C | C | C | C | C | C |
| Com. Ex. 2 | D | C | D | D | A | G | G | G | G | G | D | D | D | D | D | C | C | C | C | C |
| Com. Ex. 3 | C | B | C | C | A | E | E | E | E | E | C | C | C | C | C | C | C | C | C | C |
| Com. Ex. 4 | E | D | D | E | A | D | D | D | D | D | C | C | C | C | C | C | C | C | C | C |
| Com. Ex. 5 | A | A | A | A | A | D | D | D | D | C | C | C | C | C | C | C | C | C | C | C |
| Com. Ex. 6 | E | D | D | E | A | D | D | D | D | C | C | C | C | C | C | C | C | C | C | C |
| Com. Ex. 7 | C | C | B | C | A | G | G | G | G | G | D | D | D | D | D | C | C | C | C | C |
| Com. Ex. 8 | E | D | D | E | A | B | B | B | B | B | B | B | B | B | B | C | C | C | C | C |
| Com. Ex. 9 | E | D | D | E | A | B | B | B | B | B | B | B | B | B | B | C | C | C | C | C |

As clearly shown in Table 3, the ultraviolet ray curable ink composition of the invention is excellent in the liquid droplet ejection stability, the storage stability and the curing property. Further, the printed object of the invention exhibits superior gloss and has excellent appearance, and the pattern formation portion also has high wear resistance. Further, by using the ultraviolet ray curable ink composition of the invention, excellent results were obtained stably without the dependency of the kind of recording medium. In contrast, sufficient results are not obtained in Comparative Examples.

What is claimed is:

1. An ultraviolet ray curable ink composition adapted to be ejected by using an ink jet method, comprising:
   a polymerizable compound;
   metal powder; and
   a liquid component other than the polymerizable compound, the liquid component having an alicyclic structure including a hetero atom;
   wherein the metal powder is constituted from metal particles subjected to a surface treatment with a fluorine-containing surface treatment agent,
   wherein the amount of the liquid component contained in the ultraviolet ray curable ink composition is in the range of 0.05 mass % or more but 7.0 mass % or less, and
   wherein the fluorine-containing surface treatment agent is at least one selected from the following formulas (1) to (4);

$$P(O)R_n(OH)_{3-n} \quad (1)$$

where in the above formula (1), "R" is $CF_3(CF_2)_m(CH_2)_l$— or $CF_3(CF_2)_mO$—, "n" is an integral number in the range of 1 or more but 3 or less, "m" is an integral number in the range of 5 or more but 17 or less, and "l" is an integral number in the range of 1 or more but 12 or less;

$$CF_3(CF_2)_5(CH_2)_2P(O)(OH)(OCH_2CH_3) \quad (2);$$

$$CF_3(CF_2)_4(CH_2)_2O\text{—}P(O)(OH)_2 \quad (3); \text{ or}$$

$$CF_3(CF_2)_5(CH_2)_2O\text{—}P(O)(OH)(OC_2H_5) \quad (4).$$

2. The ultraviolet ray curable ink composition as claimed in claim 1, wherein the alicyclic structure including the hetero atom of the liquid component includes a lactone structure and/or a lactam structure.

3. The ultraviolet ray curable ink composition as claimed in claim 1, wherein the alicyclic structure including the hetero atom of the liquid component includes a cyclic structure of a five-membered ring.

4. The ultraviolet ray curable ink composition as claimed in claim 1, wherein the number of the hetero atom included in the alicyclic structure is 1.

5. The ultraviolet ray curable ink composition as claimed in claim 1, wherein each of the metal particles of the metal powder is constituted from a base particle and Al constitutes at least a surface of the base particle, and the metal particle is subjected to the surface treatment with the fluorine-containing surface treatment agent.

6. The ultraviolet ray curable ink composition as claimed in claim 1, wherein the polymerizable compound includes a monomer having an alicyclic structure.

7. The ultraviolet ray curable ink composition as claimed in claim 6, wherein the amount of the monomer having the alicyclic structure contained in the ultraviolet ray curable ink composition is in the range of 40 mass % or more but 90 mass % or less.

8. The ultraviolet ray curable ink composition as claimed in claim 6, wherein the monomer having the alicyclic structure includes a monofunctional monomer having a hetero atom in the alicyclic structure.

9. The ultraviolet ray curable ink composition as claimed in claim 8, wherein the amount of the monofunctional monomer contained in the ultraviolet ray curable ink composition is in the range of 10 mass % or more but 80 mass % or less.

10. The ultraviolet ray curable ink composition as claimed in claim 6, wherein the monomer having the alicyclic structure includes one or more selected from the group consisting of tris(2-acryloyloxy ethyl) isocyanurate, dicyclopentenyl oxyethyl acrylate, adamantyl acrylate, γ-butyrolactone acrylate, N-vinyl caprolactam, N-vinyl pyrrolidone, pentamethyl piperidyl acrylate, tetramethyl piperidyl acrylate, 2-methyl-2-adamantyl acrylate, 2-ethyl-2-adamantyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine and tetrahydrofurfuryl acrylate.

11. The ultraviolet ray curable ink composition as claimed in claim 6, wherein the polymerizable compound includes one or more selected from the group consisting of phenoxy ethyl acrylate, 2-(2-vinyloxy ethoxy) ethyl acrylate, dipropylene glycol diacrylate, tripropylene glycol diacrylate, 2-hydroxy-3-phenoxy propyl acrylate and 4-hydroxy butyl acrylate in other than the monomer having the alicyclic structure.

12. The ultraviolet ray curable ink composition as claimed in claim 1, wherein the amount of the liquid component contained in the ultraviolet ray curable ink composition is in the range of 0.06 mass % or more but 1.5 mass % or less.

13. The ultraviolet ray curable ink composition as claimed in claim 1, wherein the liquid component includes one or more selected from the group consisting of N-methylpyrrolidone, 1,3-dimethyl-2-imidazolidinone, 1,3-dioxane-2-on, 2-oxazolidinone, propylene carbonate, γ-valerolactone, γ-nonalactone, N-ethylpyrrolidone, tetrahydrofurane and piperidine.

14. The ultraviolet ray curable ink composition as claimed in claim 1, wherein the liquid component includes γ-butyrolactone and/or N-methyl-2-pyrrolidone,
wherein the polymerizable compound includes one or more selected from the group consisting of γ-butyrolactone acrylate, γ-butyrolactone methacrylate, tetrahydrofurfuryl acrylate, tetrahydrofurfuryl methacrylate, N-vinyl caprolactam, N-vinyl pyrrolidone, acryloyl morpholine, tris(2-acryloyloxy ethyl) isocyanurate, dicyclopentenyl oxyethyl acrylate, dicyclopentenyl oxyethyl methacrylate, adamantyl acrylate, adamantyl methacrylate, pentamethyl piperidyl methacrylate, tetramethyl piperidyl methacrylate, 2-methyl-2-adamantyl methacrylate, 2-ethyl-2-adamantyl methacrylate, dicyclopentenyl acrylate, dicyclopentenyl methacrylate, mevalonic acid lactone methacrylate, dimethylol tricyclodecane diacrylate, dicyclopentanyl acrylate, dicyclopentanyl methacrylate, isobornyl acrylate, isobornyl methacrylate, cyclohexyl acrylate, cyclohexyl methacrylate, dimethylol dicyclopentane diacrylate, phenoxy ethyl acrylate, 2-(2-hydroxy ethoxy) ethyl acrylate, dipropylene glycol diacrylate, tripropylene glycol diacrylate, 2-hydroxy-3-phenoxy propyl acrylate and 4-hydroxy butyl acrylate,
wherein each of the metal particles of the metal powder is constituted from a base particle and Al constitutes at least a surface of the base particle, and
wherein the fluorine-containing surface treatment agent includes one or more selected from $CF_3(CF_2)_5(CH_2)_2P(O)(OH)_2$, $CF_3(CF_2)_5(CH_2)_2P(O)(OH)(OCH_2CH_3)$, $CF_3(CF_2)_4(CH_2)_2O-P(O)(OH)_2$ or $CF_3(CF_2)_5(CH_2)_2O-P(O)(OH)(OC_2H_5)$.

15. An ultraviolet ray curable ink composition adapted to be ejected by using an ink jet method, comprising:
a polymerizable compound;
metal powder; and
a liquid component other than the polymerizable compound, the liquid component having an alicyclic structure including a hetero atom;
wherein the metal powder is constituted from metal particles subjected to a surface treatment with a fluorine-containing surface treatment agent represented by $CF_3(CF_2)_5(CH_2)_2P(O)(OH)_2$ and/or $CF_3(CF_2)_5(CH_2)_2P(O)(OH)(OCH_2CH_3)$, and
wherein the amount of the liquid component contained in the ultraviolet ray curable ink composition is in the range of 0.05 mass % or more but 7.0 mass % or less.

16. An ultraviolet ray curable ink composition adapted to be ejected by using an ink jet method, comprising:
a polymerizable compound;
metal powder; and
a liquid component other than the polymerizable compound, the liquid component having an alicyclic structure including a hetero atom;
wherein the metal powder is constituted from metal particles subjected to a surface treatment with a fluorine-containing surface treatment agent,
wherein the amount of the liquid component contained in the ultraviolet ray curable ink composition is in the range of 0.05 mass % or more but 7.0 mass % or less,
wherein the liquid component includes γ-butyrolactone and/or N-methyl-2-pyrrolidone,
wherein the polymerizable compound includes one or more selected from the group consisting of γ-butyrolactone acrylate, γ-butyrolactone methacrylate, tetrahydrofurfuryl acrylate, tetrahydrofurfuryl methacrylate, N-vinyl caprolactam, N-vinyl pyrrolidone, acryloyl morpholine, tris(2-acryloyloxy ethyl) isocyanurate, dicyclopentenyl oxyethyl acrylate, dicyclopentenyl oxyethyl methacrylate, adamantyl acrylate, adamantyl methacrylate, pentamethyl piperidyl methacrylate, tetramethyl piperidyl methacrylate, 2-methyl-2-adamantyl methacrylate, 2-ethyl-2-adamantyl methacrylate, dicyclopentenyl acrylate, dicyclopentenyl methacrylate, mevalonic acid lactone methacrylate, dimethylol tricyclodecane diacrylate, dicyclopentanyl acrylate, dicyclopentanyl methacrylate, isobornyl acrylate, isobornyl methacrylate, cyclohexyl acrylate, cyclohexyl methacrylate, dimethylol dicyclopentane diacrylate, phenoxy ethyl acrylate, 2-(2-hydroxy ethoxy) ethyl acrylate, dipropylene glycol diacrylate, tripropylene glycol diacrylate, 2-hydroxy-3-phenoxy propyl acrylate and 4-hydroxy butyl acrylate,
wherein each of the metal particles of the metal powder is constituted from a base particle and Al constitutes at least a surface of the base particle, and
wherein the fluorine-containing surface treatment agent includes one or more selected from $CF_3(CF_2)_5(CH_2)_2P(O)(OH)_2$, $CF_3(CF_2)_5(CH_2)_2P(O)(OH)(OCH_2CH_3)$, $CF_3(CF_2)_4(CH_2)_2O-P(O)(OH)_2$ or $CF_3(CF_2)_5(CH_2)_2O-P(O)(OH)(OC_2H_5)$.

17. A printed object produced by applying the ultraviolet ray curable ink composition defined by claim 1 onto a recording medium, and then irradiating the ultraviolet ray curable ink composition with an ultraviolet ray.

* * * * *